United States Patent
Honda et al.

(10) Patent No.: US 8,913,031 B2
(45) Date of Patent: *Dec. 16, 2014

(54) SENSOR APPARATUS AND ELECTRONIC APPARATUS

(75) Inventors: Hidetoshi Honda, Miyagi (JP); Hiroki Kanehira, Miyagi (JP); Hiroto Kawaguchi, Miyagi (JP); Kazutomo Miyata, Miyagi (JP); Masato Ishigaki, Miyagi (JP); Yutaka Wada, Miyagi (JP); Hiroshi Akama, Miyagi (JP)

(73) Assignee: Sony Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/940,309

(22) Filed: Nov. 5, 2010

(65) Prior Publication Data

US 2011/0175845 A1 Jul. 21, 2011

(30) Foreign Application Priority Data

Nov. 6, 2009 (JP) ................................. 2009-255530

(51) Int. Cl.
*G06F 3/045* (2006.01)
*G06F 3/044* (2006.01)
*G06F 3/041* (2006.01)

(52) U.S. Cl.
CPC .............. *G06F 3/0414* (2013.01); *G06F 3/044* (2013.01)
USPC ........................................ 345/174; 178/18.06

(58) Field of Classification Search
USPC ..................... 345/173–178; 178/18.01–20.04
See application file for complete search history.

(56) References Cited

U.S. PATENT DOCUMENTS 4,672,153 A * 6/1987 Kikuchi ..................... 178/18.09
8,169,416 B2 * 5/2012 Han ............................... 345/173
8,212,792 B2 * 7/2012 Kent ............................... 345/174
2007/0046642 A1 * 3/2007 Lee et al. ....................... 345/173
2009/0243817 A1 * 10/2009 Son .............................. 340/407.2
2009/0284487 A1 * 11/2009 Nakanishi et al. ............. 345/173
2010/0020039 A1 * 1/2010 Ricks et al. .................... 345/173
2010/0026657 A1 * 2/2010 Gettemy et al. ............... 345/174
2010/0026664 A1 * 2/2010 Geaghan ........................ 345/174
2010/0220065 A1 * 9/2010 Ma ................................ 345/173
2011/0157087 A1 * 6/2011 Kanehira et al. ............... 345/174

FOREIGN PATENT DOCUMENTS

| JP | 02-078925 | | 3/1990 |
| JP | 2000-347807 | A | 12/2000 |
| JP | 2007-304019 | A | 11/2007 |
| JP | 2008-146464 | A | 6/2008 |
| WO | WO 2009123388 | A1 * | 10/2009 .............. G06F 3/044 |

\* cited by examiner

*Primary Examiner* — Quan-Zhen Wang
*Assistant Examiner* — Chad Dicke
(74) *Attorney, Agent, or Firm* — Wolf, Greenfield & Sacks, P.C.

(57) ABSTRACT

A sensor apparatus includes: a display cover including an operation area that is pressed by an operator and a circumferential area located on the circumference of the operation area; a frame including an opening covered by the operation area and a fixing portion that fixes the circumferential area; a touch panel that is supported by the display cover to be positioned at the opening and detects a position at which the operator comes into contact with the operation area; and a pressure-sensitive sensor that is provided between the display cover and the frame, includes a first electrode and a second electrode opposed to the first electrode, and detects a pressing force with respect to the operation area based on a change of a capacitance between the first electrode and the second electrode that corresponds to a deflection amount of the display cover.

16 Claims, 28 Drawing Sheets

| Weight [N] | Change amount [$\mu$m] |
|---|---|
| 0 | 0 |
| 1 | 60 |
| 2 | 110 |
| 3 | 140 |
| 4 | 190 |
| 5 | 210 |

| Weight [N] | Capacity [pF] | Capacity change rate |
|---|---|---|
| 0 | 17.03 | 0.0% |
| 0.5 | 17.04 | 0.1% |
| 1 | 17.06 | 0.2% |
| 2 | 17.13 | 0.6% |
| 3 | 17.18 | 0.9% |
| 4 | 17.27 | 1.4% |
| 5 | 17.32 | 1.7% |

| Weight [N] | Capacity change rate |
|---|---|
| 0 | 0.0% |
| 0.5 | 0.1% |
| 1 | 0.1% |
| 2 | 0.2% |
| 3 | 0.3% |
| 4 | 0.4% |
| 5 | 0.5% |

| Weight [N] | Difference change rate |
|---|---|
| 0 | 0.0% |
| 0.5 | 0.0% |
| 1 | 0.6% |
| 2 | 3.7% |
| 3 | 5.3% |
| 4 | 9.1% |
| 5 | 10.4% |

| Weight [N] | Difference change rate (Without noise) | Difference change rate (With noise) |
|---|---|---|
| 0 | 0.0% | 0.0% |
| 0.5 | 1.5% | 1.1% |
| 1 | 2.5% | 2.1% |
| 2 | 5.3% | 4.9% |
| 3 | 6.9% | 6.8% |
| 4 | 9.2% | 9.0% |
| 5 | 10.7% | 10.5% |

| Weight [N] | Difference change rate (Without noise) | Difference change rate (With noise) |
|---|---|---|
| 0 | 0.0% | 0.0% |
| 0.5 | 0.0% | 2.2% |
| 1 | 0.6% | 4.2% |
| 2 | 3.7% | 8.1% |
| 3 | 5.3% | 11.7% |
| 4 | 9.1% | 15.0% |
| 5 | 10.4% | 18.6% |

SENSOR APPARATUS AND ELECTRONIC APPARATUS

CROSS REFERENCE TO RELATED APPLICATIONS

The present application claims priority under 35 U.S.C. §119 to Japanese Patent Application No. JP 2009-255530, filed in the Japan Patent Office on Nov. 6, 2009, the entire contents of which are incorporated herein by reference.

BACKGROUND OF THE INVENTION

1. Field of the Invention

The present invention relates to a sensor apparatus equipped with a touch panel, and an electronic apparatus.

2. Description of the Related Art

From the past, as an electronic apparatus such as a personal computer, there is known an electronic apparatus that is equipped with a touchpad. Regarding such an electronic apparatus, an input operation is made by pressing a touch surface of the touchpad using a finger or a touch pen and detecting a position pressed by the finger or the like. For example, Japanese Patent Application Laid-open No. Hei 10-198503 (FIG. 2 etc.) (hereinafter, referred to as Patent Document 1) discloses a touchpad that uses a variable capacitor to measure a position and amount of a force applied to a touch surface.

In the touchpad disclosed in Patent Document 1, one of two plates (electrodes) of the variable capacitor is provided on a flat top member that supports the touch surface. The other plate is provided on a reference frame that forms a frame of the touchpad. The flat top member and the reference frame are coupled via a plurality of springs, and the two plates are provided so as to oppose each other.

The pressed touch surface moves in a pressing direction and returns to its original position by an elastic force of the springs. At this time, a distance between the two plates of the variable capacitor changes to thus change a capacitance of the variable capacitor. Based on the capacitance change, a position and amount of a force applied to the touch surface are measured.

SUMMARY OF THE INVENTION

In the touchpad disclosed in Patent Document 1, however, a movement amount of the touch surface is restricted by the elastic force of the springs. Therefore, since the springs each having an adequate elastic force need to be incorporated at appropriate positions, the number of components becomes large and the structure becomes complex, which is a large problem in miniaturizing the touchpad.

In view of the circumstances as described above, there is a need for a sensor apparatus that has a simple structure and less number of components and an electronic apparatus including the sensor apparatus.

According to an embodiment of the present invention, there is provided a sensor apparatus including a display cover, a frame, a touch panel, and a pressure-sensitive sensor.

The display cover includes an operation area that is pressed by an operator and a circumferential area located on the circumference of the operation area.

The frame includes an opening covered by the operation area and a fixing portion that fixes the circumferential area.

The touch panel is supported by the display cover to be positioned at the opening and detects a position at which the operator comes into contact with the operation area.

The pressure-sensitive sensor is provided between the display cover and the frame, includes a first electrode and a second electrode opposed to the first electrode, and detects a pressing force with respect to the operation area based on a change of a capacitance between the first electrode and the second electrode that corresponds to a deflection amount of the display cover.

In the sensor apparatus, the touch panel detects a contact position of the operator that presses the operation area. Moreover, the pressure-sensitive sensor detects the pressing force applied to the operation area based on the deflection amount of the pressed display cover. Since the display cover is restored to its original shape by its own elastic force, there is no need to use an elastic member such as a spring. As a result, the number of components can be suppressed, and the structure of the sensor apparatus can be simplified.

The pressure-sensitive sensor may include the first electrode provided in the circumferential area, the second electrode provided on the fixing portion, and a spacer provided between the circumferential area and the fixing portion.

When the operation area is pressed a number of times, for example, a distance between the first electrode and the second electrode in a state where the operation area is not pressed may fluctuate to thus lower a detection accuracy of the pressing force that is based on a change in the capacitance. However, since the distance between the first electrode and the second electrode at a time the sensor apparatus is unused is maintained by the spacer in this embodiment, such a problem can be prevented from occurring.

Moreover, since the first electrode is provided in the circumferential area of the display cover, the deflection amount of the pressed display cover can be detected with a high sensitivity as a change in the capacitance between the first electrode and the second electrode.

The pressure-sensitive sensor may include a third electrode, a connection layer, and an operation circuit.

The third electrode is provided between the first electrode and the circumferential area while being opposed to the first electrode.

The connection layer is provided between the first electrode and the third electrode and restricts a change of a distance between the first electrode and the third electrode.

The operation circuit detects a change rate of a difference between the capacitance between the first electrode and the second electrode and a capacitance between the first electrode and the third electrode.

In the sensor apparatus, the pressing force applied to the operation area is detected based on the change rate of the difference between the capacitance between the first electrode and the second electrode and the capacitance between the first electrode and the third electrode. Since the connection layer is provided between the first electrode and the third electrode, the capacitance between the first electrode and the third electrode at a time the operation area is pressed hardly changes, with the result that the change rate of the difference takes a large value.

Moreover, since noise signals of the same phase are canceled when taking the difference, an S/N ratio of the detected signal is improved. Thus, the pressing force applied to the operation area can be detected accurately.

The pressure-sensitive sensor may include a conductive layer that is provided between the third electrode and the circumferential area while being opposed to the third electrode and to which a ground potential is connected.

When a finger or the like approaches the operation area, for example, there is a possibility that the capacitance between the first electrode and the second electrode may change.

When the capacitance between the first electrode and the second electrode is changed due to reasons other than a press of the operation area as described above, the change in the capacitance at the time the operation area is pressed does not take a predetermined value, and a detection accuracy of the pressing force is lowered. By providing the conductive layer in the sensor apparatus of this embodiment, a change in the capacitance between the first electrode and the second electrode at the time a finger or the like approaches the operation area can be suppressed.

The pressure-sensitive sensor may include a third electrode, a connection layer, and an operation circuit.

The third electrode is provided between the second electrode and the fixing portion while being opposed to the second electrode.

The connection layer is provided between the second electrode and the third electrode and restricts a change of a distance between the second electrode and the third electrode.

The operation circuit detects a change rate of a difference between the capacitance between the first electrode and the second electrode and a capacitance between the second electrode and the third electrode.

The third electrode may be provided opposed to the second electrode, and the pressing force applied to the operation area may be detected based on the change rate of the difference between the capacitance between the first electrode and the second electrode and the capacitance between the second electrode and the third electrode. Also in this case, the pressing force applied to the operation area can be detected accurately.

The pressure-sensitive sensor may include a conductive layer that is provided between the first electrode and the circumferential area while being opposed to the first electrode and to which a ground potential is connected.

In the sensor apparatus, the conductive layer is provided opposed to the first electrode. By the conductive layer, a change in the capacitance between the first electrode and the second electrode at the time a finger or the like approaches the operation area can be suppressed.

The touch panel may include a first surface fixed to the display cover and a second surface provided on the other side of the first surface.

In this case, the pressure-sensitive sensor may include the first electrode provided on the second surface, the second electrode provided on the fixing portion, a third electrode provided on the first surface while being opposed to the first electrode, and an operation circuit that detects a change rate of a difference between the capacitance between the first electrode and the second electrode and a capacitance between the first electrode and the third electrode.

In the sensor apparatus, the first electrode and the third electrode are opposed to each other with the touch panel interposed therebetween. Therefore, the capacitance between the first electrode and the third electrode hardly changes at the time the operation area is pressed. As a result, the pressing force applied to the operation area is detected accurately based on the change rate of the difference between the capacitance between the first electrode and the second electrode and the capacitance between the first electrode and the third electrode.

The touch panel may include a first surface fixed to the display cover and a second surface provided on the other side of the first surface.

In this case, the pressure-sensitive sensor may include the first electrode provided on the second surface, the second electrode provided on the fixing portion, and a conductive layer that is provided on the first surface while being opposed to the first electrode and to which a ground potential is connected.

In the sensor apparatus, the conductive layer is provided on the first surface of the touch panel. The conductive layer is provided opposed to the first electrode with the touch panel interposed therebetween. As a result, a change of the capacitance between the first electrode and the second electrode at the time a finger or the like approaches the operation area can be suppressed.

The display cover may be rectangular. In this case, the first electrode and the second electrode may be provided on at least one side of the display cover.

The first electrode and the second electrode may be formed annularly along an edge of the display cover.

With this structure, the number of wirings from the pressure-sensitive sensor can be reduced, and the structure of the sensor apparatus can be simplified.

A gap between the first electrode and the second electrode may be an air gap.

When the gap between the first electrode and the second electrode is formed as an air gap, the distance between the first electrode and the second electrode can be changed with ease at the time the operation area is pressed.

Therefore, even when the pressing force applied to the operation area is small and the deflection amount of the display cover is thus small, the pressing force can be detected with a high sensitivity based on the capacitance between the first electrode and the second electrode.

The sensor apparatus may further include a display panel including a first surface fixed to the touch panel and a second surface provided on the other side of the first surface. In this case, the pressure-sensitive sensor is provided on the second surface.

In the sensor apparatus, by the display panel, an image is displayed in the operation area. The operation area is positioned on the first surface side when seen from the display panel. Therefore, the pressure-sensitive sensor provided on the second surface of the display panel does not block the display of an image on the display panel. As a result, a degree of freedom in the shape and number of the pressure-sensitive sensor, a position of the pressure-sensitive sensor with respect to the display panel, and the like increases.

According to an embodiment of the present invention, there is provided an electronic apparatus including a display cover, a frame, a touch panel, a pressure-sensitive sensor, and a control unit.

The display cover includes an operation area that is pressed by an operator and a circumferential area located on the circumference of the operation area.

The frame includes an opening covered by the operation area and a fixing portion that fixes the circumferential area.

The touch panel is supported by the display cover to be positioned at the opening and detects a position at which the operator comes into contact with the operation area.

The pressure-sensitive sensor is provided between the display cover and the frame, includes a first electrode and a second electrode opposed to the first electrode, and detects a pressing force with respect to the operation area based on a change of a capacitance between the first electrode and the second electrode that corresponds to a deflection amount of the display cover.

The control unit processes a signal on a contact position of the operator detected by the touch panel and a signal on the pressing force of the operator detected by the pressure-sensitive sensor.

As described above, according to the embodiments of the present invention, a sensor apparatus that has a simple structure and less number of components and an electronic apparatus including the sensor apparatus can be provided.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, embodiments of the present invention will be described with reference to the drawings.

<First Embodiment>

(Structure of Sensor Apparatus)

Figure 1:
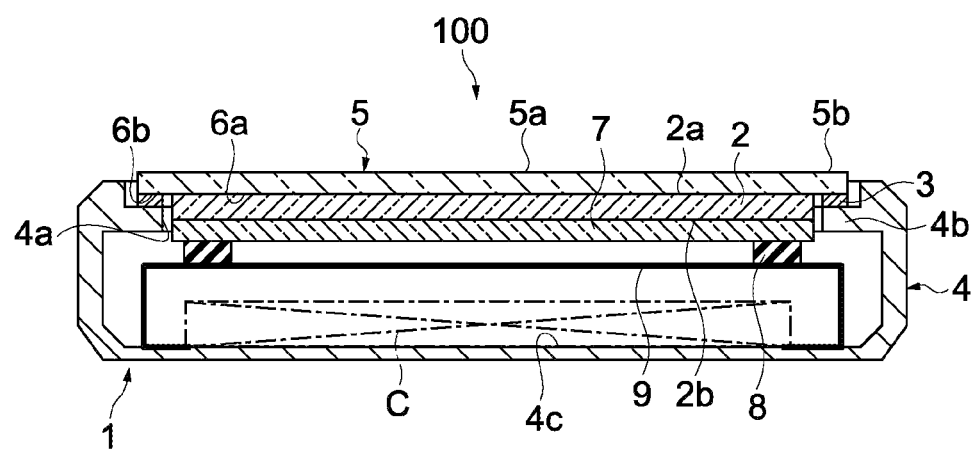
FIG. 1 is a cross-sectional diagram schematically showing a sensor apparatus according to a first embodiment of the present invention.
Figure 2:
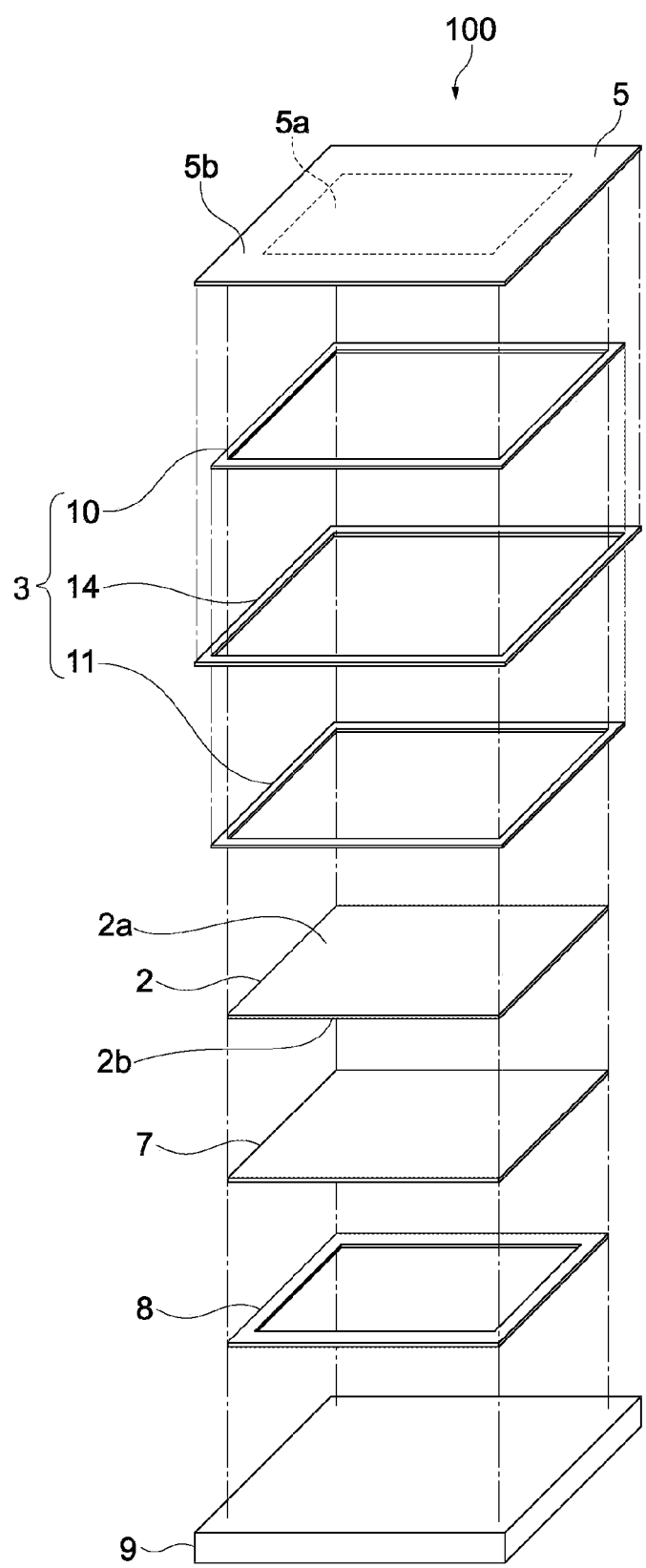
FIG. 2 is an exploded perspective view schematically showing the sensor apparatus shown in FIG. 1.

FIG. 1 is a cross-sectional diagram schematically showing a sensor apparatus according to a first embodiment of the present invention. FIG. 2 is an exploded perspective view schematically showing the sensor apparatus shown in FIG. 1. In FIG. 2, an illustration of a frame of the sensor apparatus to be described later is omitted.

A sensor apparatus 100 includes a casing 1, a touch panel 2 provided inside the casing 1, and a pressure-sensitive sensor 3. The casing 1 includes a frame 4 on which an opening 4a is formed and a display cover 5 that is fixed to the frame 4 so as to cover the opening 4a. The opening 4a covered by the display cover 5 constitutes a part of an inner space of the casing 1. The touch panel 2 is supported by the display cover 5 so as to be positioned at the opening 4a.

As shown in FIG. 2, the display cover 5 is rectangular and includes an operation area 5a that is pressed by an operator (not shown) such as a finger and a touch pen and a circumferential area 5b surrounding the operation area 5a. The frame 4 includes a fixing portion 4b provided around the opening 4a, and the circumferential area 5b of the display cover 5 is fixed to the fixing portion 4b as shown in FIG. 1. Therefore, the operation area 5a of the display cover 5 covers the opening 4a of the frame 4.

The display cover 5 is structured such that the operation area 5a is flexible with respect to a predetermined pressing force or more that acts on the operation area 5a with a joint of the circumferential area 5b and the fixing portion 4b being a fulcrum. The deflection deformation of the operation area 5a is elastic, and a deflection amount of the operation area 5a changes successively in accordance with a pressing force. The display cover 5 can be constituted of a glass plate, a ceramic plate, and the like in addition to a transparent plastic plate formed of, for example, an acrylic resin, a polycarbonate resin, and PET (polyethylene terephthalate). A thickness, size, and the like of the display cover 5 are set such that the display cover 5 can be deformed when a user applies a predetermined press operation force or more while having adequate rigidity as a part of the casing.

In this embodiment, an upper surface 2a (first surface) of the touch panel 2 is bonded to an inner surface 6a of the operation area 5a of the display cover 5, and a display panel 7 such as a liquid crystal panel is provided on a lower surface 2b (second surface) of the touch panel 2.

The inner surface 6a of the operation area 5a and the upper surface 2a of the touch panel 2 are bonded to each other by, for example, a transparent adhesive layer (not shown) such as an elastic optical resin "SVR (Super View Resin)" (product name) available from Sony Chemical & Information Device Corporation. The lower surface 2b of the touch panel 2 and the display panel 7 are also bonded to each other by the same adhesive layer. A metal shield 9 is provided on a lower side of the display panel 7 via cushion members 8, and the metal shield 9 is fixed to a bottom portion 4c of the frame 4.

In this embodiment, a capacitance-type panel is used as the touch panel 2. For example, two substrates of an X electrode substrate and a Y electrode substrate each constituted of a transparent member such as a PET substrate are laminated. On the X electrode substrate and the Y electrode substrate, an X transparent electrode pattern for detection and a Y transparent electrode pattern for detection each formed of a transparent conductive material such as ITO (Indium Tin Oxide) are formed, respectively. Both the X transparent electrode pattern for detection and the Y transparent electrode pattern for detection are formed as stripes extending in one direction. The X electrode substrate and the Y electrode substrate are laminated such that the extension direction of the X transparent electrode pattern for detection and the extension direction of the Y transparent electrode pattern for detection become substantially orthogonal. When the panel as described above is used as the touch panel 2, the X transparent electrode pattern for detection and the Y transparent electrode pattern for detection are electrically connected to a control unit C.

Instead of the capacitance-type touch panel, an optical-type, surface-elastic-wave-type, resistance-film-type, or ultrasonic-wave-type touch panel, for example, may be used as the touch panel 2.

The control unit C is constituted of, for example, various electronic components including a circuit board, an operational processing circuit mounted on the circuit board, and a memory. The control unit C is accommodated in the casing 1 (frame 4), more specifically, provided in a space formed between the metal shield 9 and the bottom portion 4c of the frame 4. The control unit C controls an overall operation of the sensor apparatus 100 through detection control of an operation position by the touch panel 2, display control of the display panel 7, detection control of a pressing force by the pressure-sensitive sensor 3 to be described later, and the like.

Next, a structure of the pressure-sensitive sensor 3 will be described.

As shown in FIG. 1, the pressure-sensitive sensor 3 is interposed between the display cover 5 and the frame 4. As shown in FIG. 2, the pressure-sensitive sensor 3 includes a first electrode 10 that is formed annularly and a second electrode 11 that is also formed annularly. Wirings (not shown) are connected to the first electrode 10 and the second electrode 11. By the wirings, the first electrode 10 and the second electrode 11 are electrically connected to the control unit C. The touch panel 2 is provided on an inner side of the annular first electrode 10 and second electrode 11.

For the first electrode 10 and the second electrode 11, a metal material such as copper, silver, nickel, aluminum, and gold or a transparent conductive oxide material such as ZnO and ITO is used. Moreover, an electrode obtained by laminating an insulation material such as polyimide on surfaces formed of the conductive materials described above may be used as the first electrode 10 and the second electrode 11.

Figure 3:
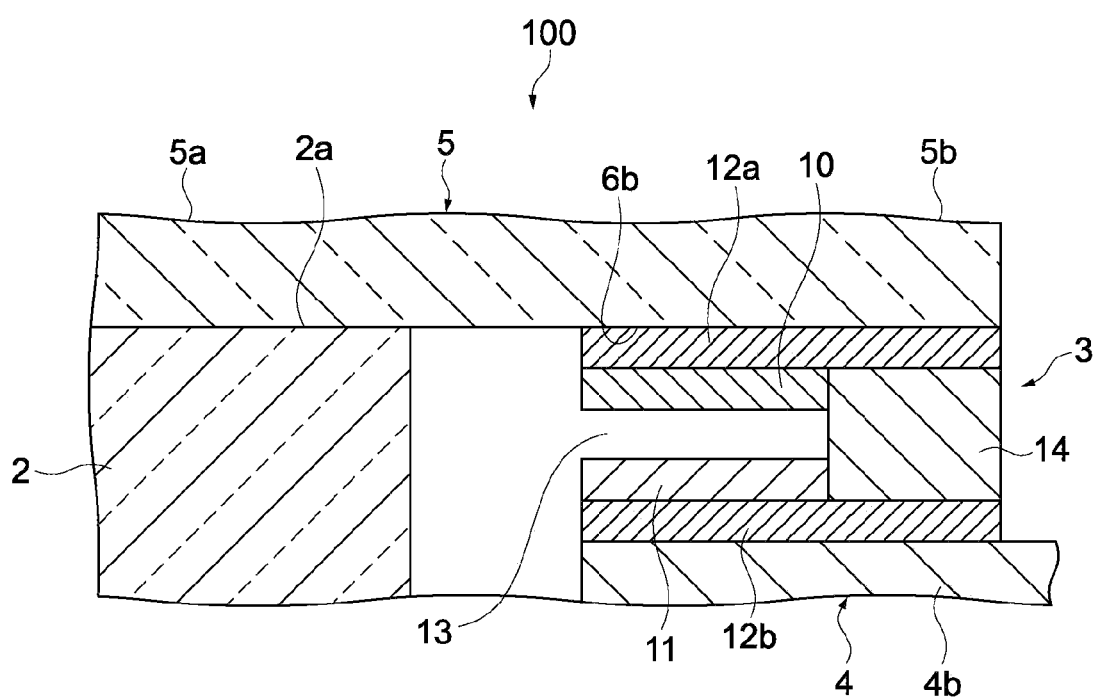
FIG. 3 is a partially-enlarged view showing an enlarged pressure-sensitive sensor shown in FIG. 1.

FIG. 3 is a partially-enlarged view showing an enlarged pressure-sensitive sensor 3 shown in FIG. 1. As shown in FIG. 3, the first electrode 10 described above is provided on an inner surface 6b of the circumferential area 5b of the display cover 5 via an adhesive 12a. The second electrode 11 is provided on the fixing portion 4b of the frame 4 via an adhesive 12b. The first electrode 10 and the second electrode 11 are provided opposed to each other, and a gap between the first electrode 10 and the second electrode 11 becomes an air gap 13. As the adhesives 12a and 12b, an acrylic-resin-based transparent adhesive is used, for example.

Thicknesses of the first electrode 10 and the second electrode 11 are, for example, 10 μm or more and 100 μm or less. Moreover, a contact width of the first electrode 10 and the inner surface 6b of the circumferential area 5b of the display cover 5 is, for example, 1 mm. Similarly, a contact width of the second electrode 11 and the fixing portion 4b of the frame 4 is, for example, 1 mm. A size of the air gap 13 is, for example, 10 μm or more and 100 μm or less and is 10 μm or more and 30 μm or less in this embodiment. The size of the air gap 13 is set such that the first electrode 10 and the second electrode 11 do not come into contact with each other during a deflection deformation of the display cover 5.

As the first electrode 10, an electrode obtained by printing a metal paste of, for example, copper or gold onto the inner surface 6b of the circumferential area 5b of the display cover 5 may be used. Similarly, as the second electrode 11, an electrode obtained by printing a metal paste onto the fixing portion 4b of the frame 4 may be used.

Further, as shown in FIGS. 2 and 3, the pressure-sensitive sensor 3 includes a spacer 14 that is formed annularly. The spacer 14 is fixed between the inner surface 6b of the circumferential area 5b of the display cover 5 and the fixing portion 4b of the frame 4 via the adhesives 12a and 12b. Specifically, in this embodiment, the circumferential area 5b of the display cover 5 and the fixing portion 4b of the frame 4 are fixed to each other via the spacer 14, and the air gap 13 between the first electrode 10 and the second electrode 11 is formed by the spacer 14.

For the spacer 14, an insulation material such as a PET film is used. A thickness of the spacer 14 is set as appropriate such that the size of the air gap 13 between the first electrode 10 and the second electrode 11 becomes 10 μm or more and 30 μm or less. Moreover, it is also possible to provide an adhesive having a predetermined thickness between the inner surface 6b of the circumferential area 5b and the fixing portion 4b and use it as the spacer 14.

The pressure-sensitive sensor 3 further includes an operation circuit for detecting a capacitance change between the first electrode 10 and the second electrode 11 at a time the operation area 5a is operated. In this embodiment, the operation circuit is constituted as a part of the control unit C. It should be noted that the operation circuit may be structured separate from the control unit C. In this case, an output of the operation circuit is supplied to the control unit C.

(Operation of Sensor Apparatus)

Figure 4A:
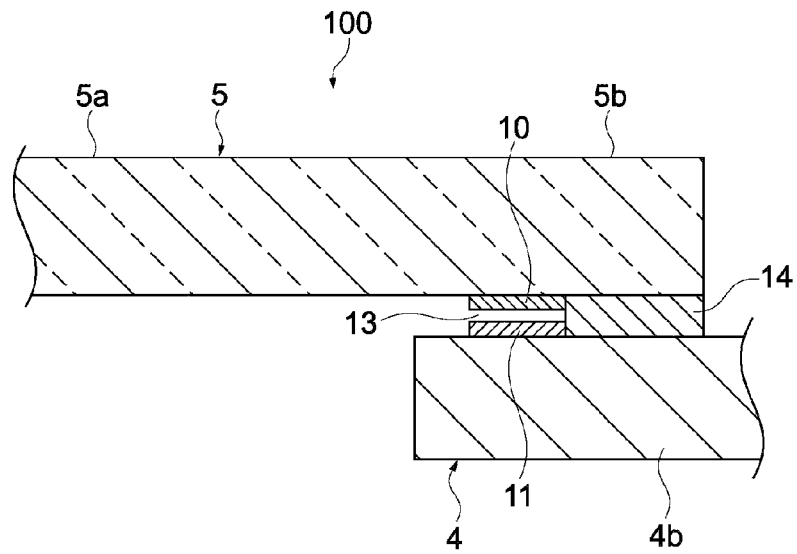
FIG. 4 are diagrams for explaining an operation of the sensor apparatus shown in FIG. 1.
Figure 4B:
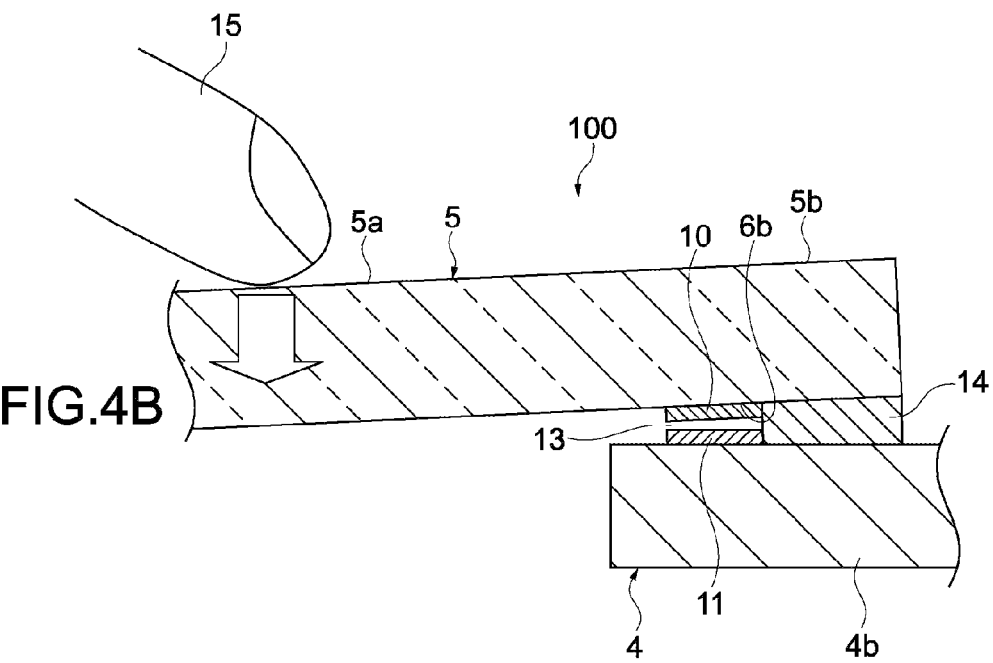

FIG. 4 are diagrams for explaining an operation of the sensor apparatus 100 shown in FIG. 1. In the following description, a finger of a user is used as an operator, and the finger presses the operation area 5a of the display cover 5. FIG. 4A is a diagram showing the unoperated sensor apparatus 100 in which the operation area 5a is not pressed, and FIG. 4B is a diagram showing the sensor apparatus 100 in a state where the operation area 5a is pressed by a finger 15.

As shown in FIG. 4A, when unoperated, the air gap 13 between the first electrode 10 and the second electrode 11 is kept at a predetermined size by the spacer 14. When the operation area 5a of the display cover 5 is pressed by the finger 15 as shown in FIG. 4B, a contact position of the pressing finger 15 is detected by the touch panel 2 shown in FIG. 1 and the like. Moreover, the pressure-sensitive sensor 3 detects a pressing force applied to the operation area 5a.

A predetermined voltage is applied to the X transparent electrode pattern for detection and the Y transparent electrode pattern for detection of the touch panel 2. When the operator is brought into contact with the operation area 5a, a capacitance of the X transparent electrode pattern for detection and the Y transparent electrode pattern for detection that overlap at the contact position changes. Consequently, currents flowing through the X transparent electrode pattern for detection and the Y transparent electrode pattern for detection change, and the change is detected by the control unit C. Based on the detected current change, the control unit C specifies XY coordinates of a position at which the operator is brought into contact and controls an operation of the sensor apparatus 100 based on the specified coordinates.

As shown in FIGS. 4A and 4B, the display cover 5 is fixed to the fixing portion 4b of the frame 4 at the circumferential area 5b surrounding the operation area 5a. Therefore, when the operation area 5a is pressed by the finger 15, the display cover 5 is deformed to be bent in a pressing direction.

When the display cover 5 is deformed to be bent, the first electrode 10 provided on the inner surface 6b of the circumferential area 5b moves toward the second electrode 11 as shown in FIG. 4B. As a result, since the distance between the first electrode 10 and the second electrode 11 changes, a capacitance between the first electrode 10 and the second electrode 11 changes. The capacitance change between the first electrode 10 and the second electrode 11 is detected by the control unit C. The control unit C detects a pressing force applied to the operation area 5a based on the detected capacitance change and controls the operation of the sensor apparatus 100 based on a result of the detection.

FIG. 5 are a graph and a table showing a relationship between a pressing force applied to the display cover 5 and a deflection amount of the display cover 5. Here, a rectangular hardened glass plate is used as the display cover 5. The size of the glass plate is 115 mm×62 mm, and a thickness thereof is 0.5 mm.

Figures 5A, 5B:
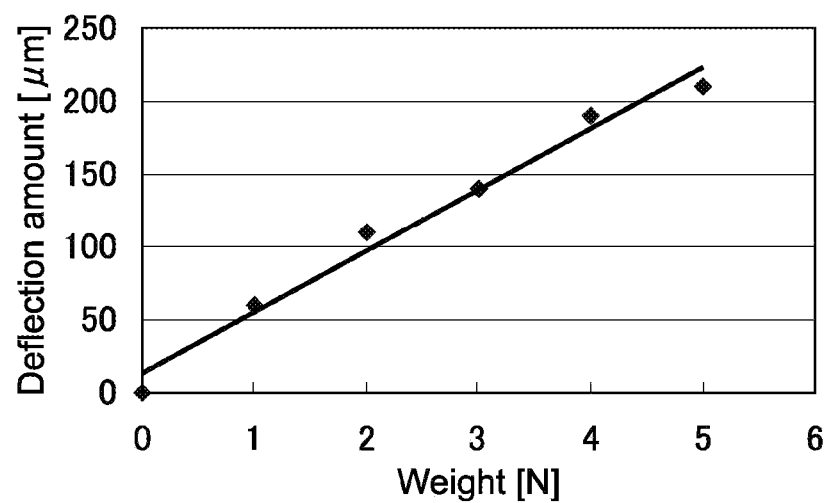
FIG. 5 are a graph and a table showing a relationship between a pressing force applied to a display cover and a deflection amount of the display cover.

The circumferential area 5b of the display cover 5 is fixed, and the operation area 5a is pressed at substantially the center thereof. Consequently, the deflection amount of the display cover 5 has linear characteristics practically proportional to the pressing force as shown in the graph of FIG. 5A. Thus, the first electrode 10 provided on the inner surface 6b of the circumferential area 5b is also displaced practically proportional to the pressing force and moves toward the second electrode 11.

FIG. 6 are diagrams for explaining a displacement amount of the first electrode 10 at a time the operation area 5a of the display cover 5 is pressed. FIG. 6 show only the first electrode 10 and the second electrode 11 for convenience. Here, the hardened glass plate described above is used as the display cover 5.

Figure 6A:
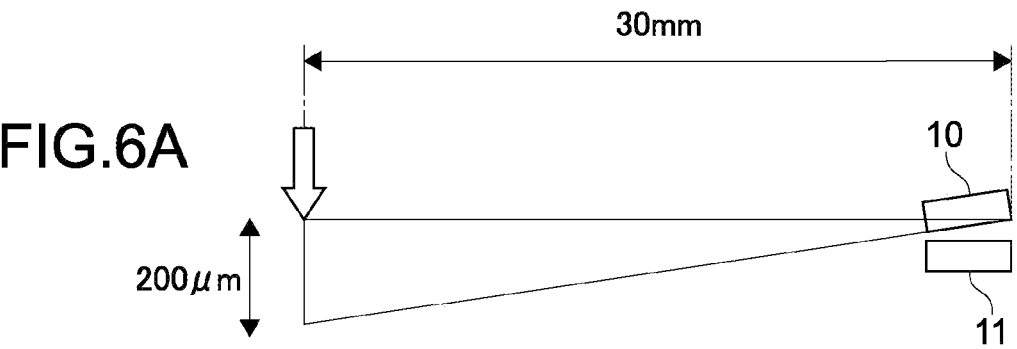
FIG. 6 are diagrams for explaining a displacement amount of a first electrode at a time an operation area of the display cover is pressed.

FIG. 6A shows a state where the operation area 5a is pressed at substantially the center thereof and the deflection amount of the display cover 5 is approximately 200 μm. In FIG. 6A, the display cover 5 having a size of 115 mm×62 mm (size of hardened glass plate described above) is seen from a side having a length of 62 mm. Thus, substantially the center of the operation area 5a is a position that is approximately 30 mm apart from the first electrode 10. In addition, a width of the first electrode 10 (contact width with respect to circumferential area 5b) is 1 mm.

Figure 6B:
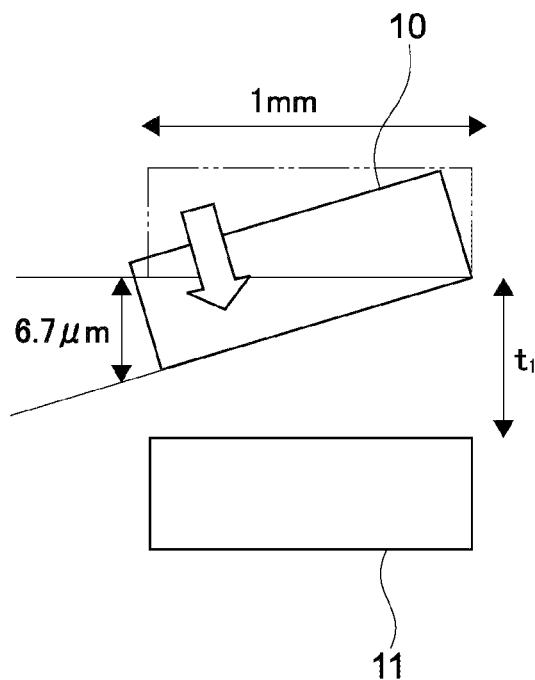

FIG. 6B is an enlarged diagram of the first electrode 10 and the second electrode 11. When the deflection amount of the display cover 5 is approximately 200 μm, the first electrode 10 is displaced approximately 6.7 μm toward the second electrode 11 as shown in FIG. 6B. When the operation area 5a is pressed at a portion other than the portion at substantially the center thereof, the deflection amount of the display cover 5 sometimes becomes smaller than 200 μm even with the same pressing force. In this case, the displacement amount of the first electrode 10 also becomes small. In this regard, approximately 3.3 μm that is approximately half the displacement amount described above of approximately 6.7 μm is used as a mean value of the displacement amounts of the first electrode 10 at the time the operation area 5a is pressed.

When a distance $t_1$ between the first electrode 10 and the second electrode 11 at a time the sensor apparatus 100 is unoperated is 30 μm, for example, a change rate of the distance $t_1$ during operation becomes approximately 11% in average. As long as the change rate is about 11%, the change can be sufficiently detected as a capacitance change between the first electrode 10 and the second electrode 11.

FIG. 7 are a graph and a table showing a change and change rate of the capacitance between the first electrode 10 and the second electrode 11 at the time the operation area 5a of the display cover 5 is pressed. Here, a hardened glass plate having a size of 115 mm×62 mm and a thickness of 1 mm is used as the display cover 5. A deflection amount of the hardened glass plate also has linear characteristics practically proportional to the pressing force. As the first electrode 10 and the second electrode 11, an electrode in which 25 μm of polyimide is formed on a surface of a copper foil having a thickness of 9 μm is used.

Figures 7A, 7B:
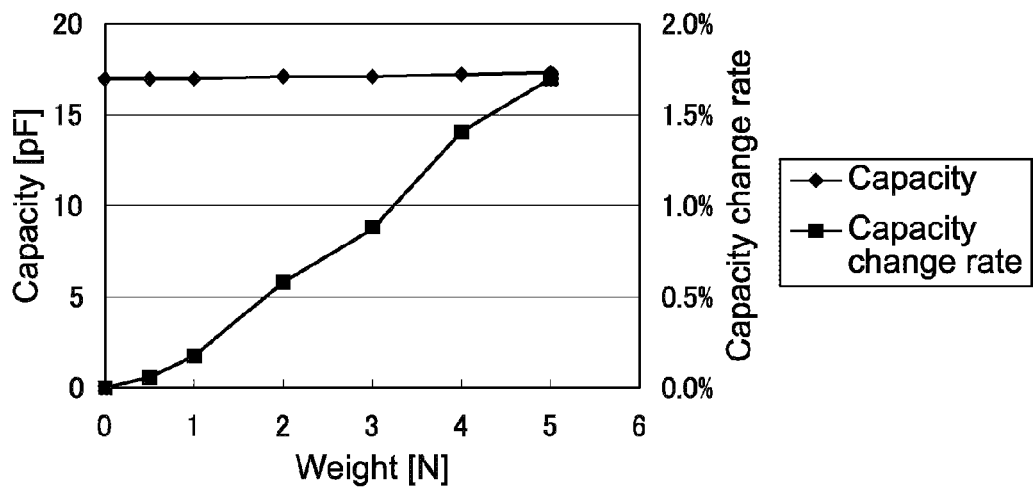
FIG. 7 are a graph and a table showing a change and change rate of a capacitance between the first and second electrodes at the time the operation area of the display cover is pressed.

As shown in the graph of FIG. 7A, the capacitance change between the first electrode 10 and the second electrode 11 is slight. However, it can be seen that since the capacitance change rate is practically proportional to the pressing force, the capacitance between the first electrode 10 and the second electrode 11 also changes linearly practically in proportion to the pressing force. Therefore, by detecting the capacitance change between the first electrode 10 and the second electrode 11, a pressing force applied to the operation area 5a of the display cover 5 can be detected.

In the sensor apparatus 100 of this embodiment, a contact position of the operator that presses the operation area 5a is detected by the touch panel 2. In addition, the pressure-sensitive sensor 3 detects a pressing force applied to the operation area 5a in accordance with the deflection amount of the pressed display cover 5. Since the display cover 5 is restored to its original shape by its own elastic force, an elastic member such as a spring becomes unnecessary. As a result, the number of components can be reduced, and the structure of the sensor apparatus 100 can be simplified. Moreover, component costs can be suppressed, and workability in assembling the sensor apparatus 100 can be improved.

Further, in the pressure-sensitive sensor 3 of the sensor apparatus 100, the spacer 14 is provided between the circumferential area 5b of the display cover 5 and the fixing portion 4b of the frame 4. When the operation area 5a is pressed a number of times, for example, there is a possibility that the distance between the first electrode 10 and the second electrode 11 in a state where the operation area 5a is not pressed may fluctuate to thus lower a detection accuracy of the pressing force that is based on the capacitance change. In this embodiment, however, since the distance between the first electrode 10 and the second electrode 11 at the time the sensor apparatus 100 is unoperated is maintained by the spacer 14, such a problem can be prevented from occurring. Moreover, since the first electrode 10 is provided in the circumferential area 5b of the display cover 5, the first electrode 10 is displaced following the deflection of the display cover 5. Thus, the pressing force applied to the operation area 5a can be detected with a high sensitivity. In addition, since the first electrode 10 and the second electrode 11 are formed annularly in this embodiment, the pressing force can be detected highly accurately irrespective of the pressing position of the operation area 5a.

Furthermore, since the pressing force is detected based on the deflection amount of the display cover 5 in this embodiment, the distance between the first electrode 10 and the second electrode 11 can be made smaller than that in a case where an elastic member such as a spring is used. As a result, a detection sensitivity of the pressing force applied to the operation area 5a can be improved. Moreover, since the display cover 5 is restored to its original shape by its own elastic force, a reaction speed in detecting a pressing force can be made higher than that in a case where a spring or the like is used.

<Second Embodiment>

Next, a sensor apparatus according to a second embodiment of the present invention will be described. In the following description, parts having the same structure and operation as those of the sensor apparatus 100 described in the above embodiment will be denoted by the same symbols, and descriptions thereof will be omitted or simplified.

Figure 8:
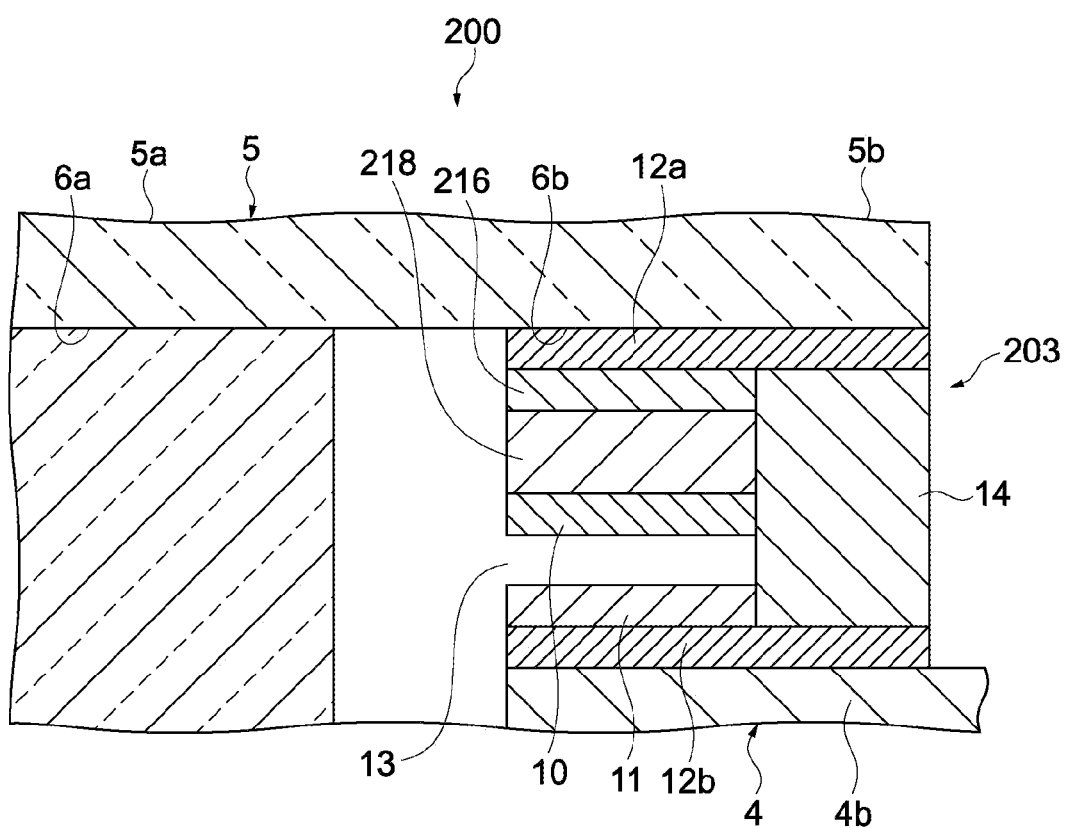
FIG. 8 is a cross-sectional diagram schematically showing an enlarged pressure-sensitive sensor of a sensor apparatus according to a second embodiment of the present invention.

FIG. 8 is a cross-sectional diagram schematically showing an enlarged pressure-sensitive sensor of the sensor apparatus according to the second embodiment of the present invention. In a sensor apparatus 200 of this embodiment, a structure of the pressure-sensitive sensor is different from that of the sensor apparatus 100 of the first embodiment. Therefore, that point will mainly be described.

A pressure-sensitive sensor 203 includes the first electrode 10 and the second electrode 11 opposing each other and a differential electrode (third electrode) 216. The differential electrode 216 is provided between the first electrode 10 and the circumferential area 5b while being opposed to the first electrode 10 and is bonded to the inner surface 6b of the circumferential area 5b by the adhesive 12a. For the differential electrode 216, the same conductive material as the first electrode 10 and the second electrode 11 is used. An electrode in which an insulation layer formed of, for example, polyimde is formed on a surface of the conductive material may be used as the differential electrode 216.

A connection layer 218 is provided between the differential electrode 216 and the first electrode 10. The connection layer 218 restricts, by integrally bonding the differential electrode 216 and the first electrode 10, a change of the distance between the first electrode 10 and the differential electrode 216 at a time the operation area 5a of the display cover 5 is pressed. For the connection layer 218, an insulation material such as a PET film is used. Alternatively, an adhesive whose thickness is set as appropriate may be used as the connection layer 218.

The spacer 14 is provided between the inner surface 6b of the circumferential area 5b of the display cover 5 and the fixing portion 4b of the frame 4. The thickness of the spacer 14 is set as appropriate such that the size of the air gap 13 between the first electrode 10 and the second electrode 11 becomes a desired size.

In this embodiment, the first electrode 10, the second electrode 11, and the differential electrode 216 are each electrically connected to a common circuit board (not shown). When the operation area 5a is pressed, a change rate of a difference between the capacitance between the first electrode 10 and the second electrode 11 and a capacitance between the first electrode 10 and the differential electrode 216 is detected by the control unit C.

FIG. 9 are a graph and a table showing a change rate of the capacitance between the first electrode 10 and the second electrode 11 and a change rate of the capacitance between the first electrode 10 and the differential electrode 216 at the time the operation area 5a of the display cover 5 is pressed. FIG. 10 are a graph and a table showing a change rate of the difference between the capacitance between the first electrode 10 and the second electrode 11 and the capacitance between the first electrode 10 and the differential electrode 216.

Figures 9A, 9B:
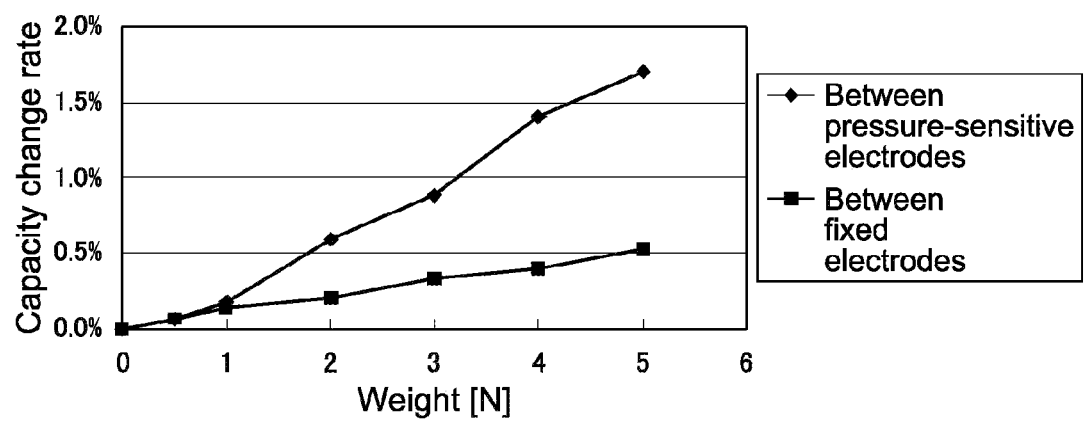
FIG. 9 are a graph and a table showing a change rate of the capacitance between the first and second electrodes and a change rate of a capacitance between the first electrode and a differential electrode at the time the operation area of the display cover is pressed.

In FIG. 9, the first electrode 10 and the second electrode 11 are each illustrated as a pressure-sensitive electrode. Moreover, the first electrode 10 and the differential electrode 216 are each illustrated as a fixed electrode. Further, in the table of FIG. 9B, only the values of a capacitance change rate between the first electrode 10 and the differential electrode 216 are shown. Capacitance change rates between the first electrode 10 and the second electrode 11 are substantially the same as those of the first embodiment shown in FIG. 7.

As the display cover 5, a hardened glass plate having a size of 115 mm×62 mm and a thickness of 1 mm is used. As each of the first electrode 10, the second electrode 11, and the differential electrode 216, an electrode in which 25 μm of polyimide is formed on a surface of a copper foil having a thickness of 9 μm is used. As the connection layer 218, an adhesive having a thickness of 125 μm is used. It should be noted that the thicknesses of other adhesives 12a and 12b that are not used as the connection layer 218 are 25 μm. The thickness of the spacer 14 is set as appropriate such that the size of the air gap 13 between the first electrode 10 and the second electrode 11 becomes 30 μm.

As shown in FIG. 9, the capacitance change rate between the first electrode 10 and the differential electrode 216 is smaller than that between the first electrode 10 and the second electrode 11. This is because the connection layer 218 that restricts a distance change between the first electrode 10 and the differential electrode 216 is provided between the first electrode 10 and the differential electrode 216.

Figures 10A, 10B:
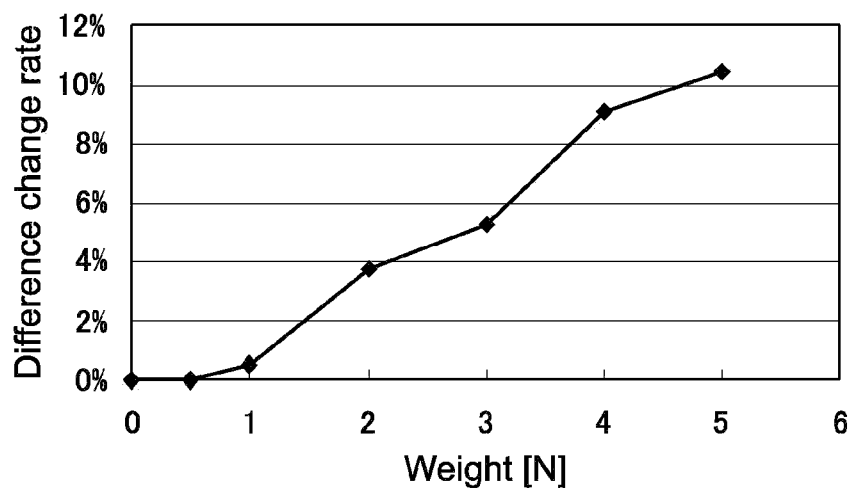
FIG. 10 are a graph and a table showing a change rate of a difference between the capacitance between the first and second electrodes and the capacitance between the first electrode and the differential electrode.

Therefore, as shown in the graph of FIG. 10A, the change rate of the difference between the capacitance between the first electrode 10 and the second electrode 11 and the capacitance between the first electrode 10 and the differential electrode 216 becomes a value exceeding 10% at the time the operation area 5a is pressed with a pressing force of 5 N. The capacitance change rate between the first electrode 10 and the second electrode 11 of the first embodiment shown in the graph of FIG. 7A has been about 1.7% with the pressing force of 5 N. Specifically, the change rate of the difference described above becomes considerably larger than the capacitance change rate between the first electrode 10 and the second electrode 11.

Moreover, since noise signals of the same phase are canceled when taking the difference, an S/N ratio of the detected signal is improved. Thus, the pressing force applied to the operation area 5a can be detected accurately.

The differential electrode 216 may be provided between the second electrode 11 and the fixing portion 4b of the frame 4 while being opposed to the second electrode 11. In this case, the differential electrode 216 is bonded to the fixing portion 4b by the adhesive 12b. Further, the connection layer 218 is provided between the differential electrode 216 and the second electrode 11, and the differential electrode 216 and the second electrode 11 are opposed to each other with the connection layer 218 interposed therebetween. When the differential electrode 216 is provided as described above, a change rate of a difference between the capacitance between the first electrode 10 and the second electrode 11 and a capacitance between the second electrode 11 and the differential electrode 216 is detected by the control unit C. The pressing force applied to the operation area 5a can be detected accurately based on the difference change rate.

<Third Embodiment>

Figure 11:
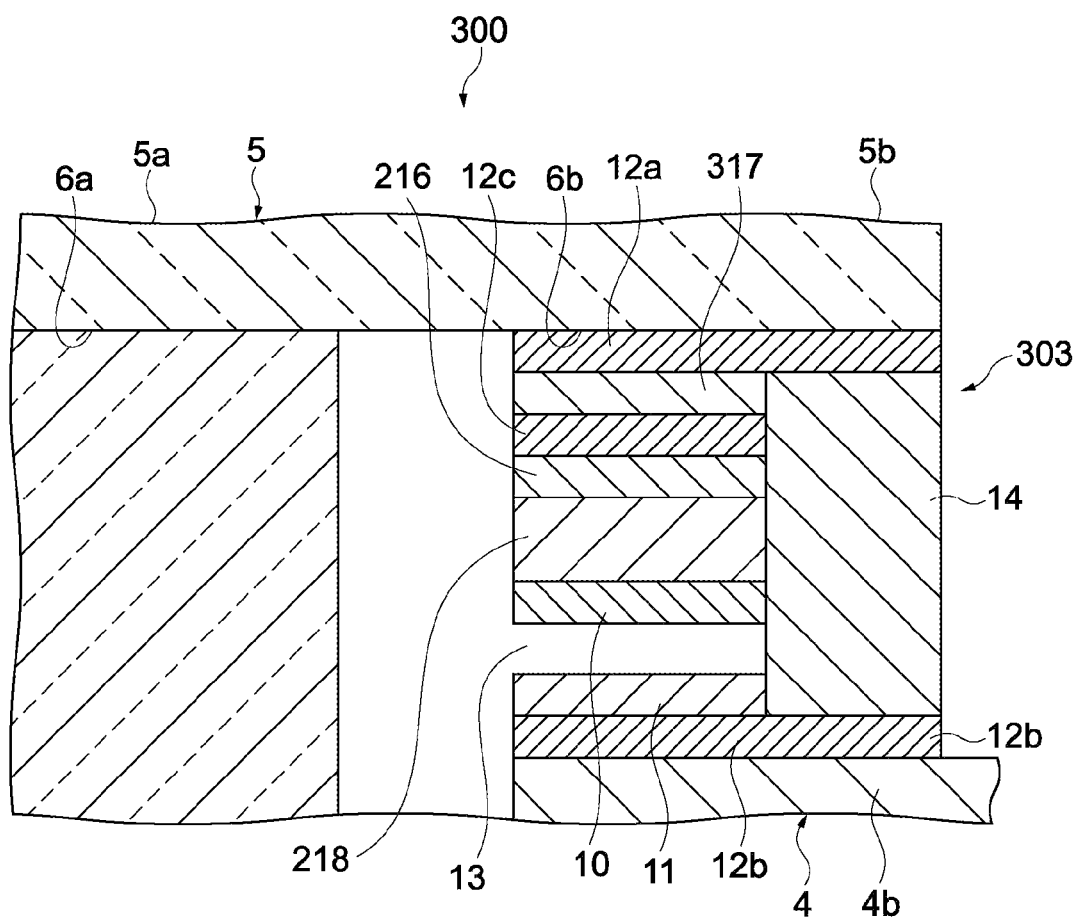
FIG. 11 is a cross-sectional diagram schematically showing an enlarged pressure-sensitive sensor of a sensor apparatus according to a third embodiment of the present invention.

FIG. 11 is a cross-sectional diagram schematically showing an enlarged pressure-sensitive sensor of a sensor apparatus according to a third embodiment of the present invention. A sensor apparatus 300 of this embodiment is obtained by providing a shield layer 317 (conductive layer) in the pressure-sensitive sensor 203 of the second embodiment.

As shown in FIG. 11, the shield layer 317 is provided between the differential electrode 216 and the circumferential area 5b while being opposed to the differential electrode 216. The shield layer 317 is bonded to the inner surface 6b of the circumferential area 5b by the adhesive 12a. An adhesive 12c is provided between the differential electrode 216 and the shield layer 317, and the shield layer 317 and the differential electrode 216 are opposed to each other with the adhesive 12c interposed therebetween as shown in FIG. 11.

For the shield layer 317, the same conductive material as the first electrode 10, the second electrode 11, and the differential electrode 216 is used. A layer obtained by forming an insulation layer formed of, for example, polyimide on a surface of the conductive material may be used as the shield layer 317. In this embodiment, a layer obtained by forming 25 μm of polyimide on a surface of a copper foil having a thickness of 9 μm is used as the shield layer 317. Moreover, the shield layer 317 is connected to a ground potential.

FIG. 12 are a graph and a table comparing the "difference change rate" described in the second embodiment between a case with a noise and a case without a noise. First, noises used herein will be described. In the embodiments of the present invention, the pressing force applied to the operation area 5a is detected based on the capacitance change between the first electrode 10 and the second electrode 11. For example, there may be a case where, when a finger or the like approaches the operation area 5a, the capacitance between the first electrode 10 and the second electrode 11 changes even when the finger is not in contact with the operation area 5a. When the capacitance between the first electrode 10 and the second electrode 11 is changed by causes other than the press of the operation area 5a, the capacitance change at the time the operation area 5a is pressed does not become a predetermined value and the detection accuracy of the pressing force is lowered.

Figures 12A, 12B:
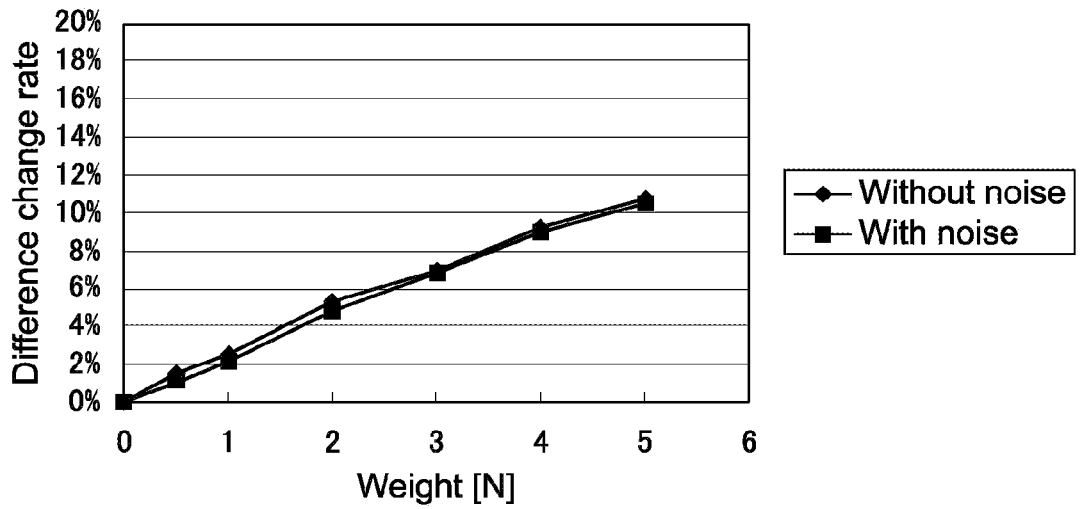
FIG. 12 are a graph and a table comparing the "change rate of a difference" described in the second embodiment between a case with a noise and a case without a noise.

In the graph of FIG. 12A, difference change rates at a time a finger or the like approaches the operation area 5a and the operation area 5a is pressed in that state are shown in the graph of "with a noise".

Since the shield layer 317 is provided in the pressure-sensitive sensor 303 of this embodiment, the graph of "without a noise" and the graph of "with a noise" become substantially the same as shown in FIG. 12. In other words, by forming the shield layer 317, the capacitance change between the first electrode 10 and the second electrode 11 at the time a finger or the like approaches the operation area 5a can be suppressed.

Figures 13A, 13B:
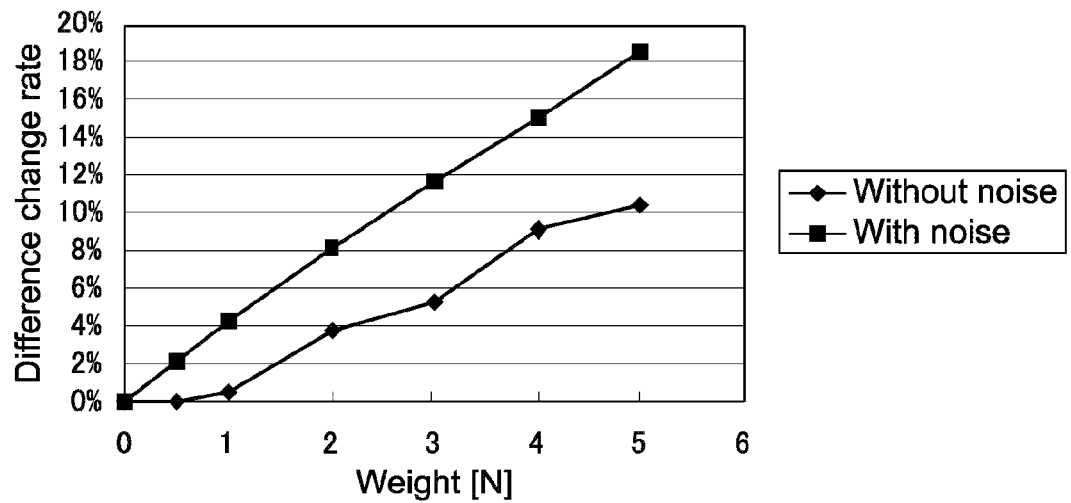
FIG. 13 are a graph and a table showing the change rate of a difference in the case "without a noise" and the case "with a noise" in the pressure-sensitive sensor as a comparative example in which no shield layer is provided.

FIG. 13 are a graph and a table showing a change rate of a difference in the case "without a noise" and the case "with a noise" in the pressure-sensitive sensor as a comparative example in which no shield layer is provided. In the pressure-sensitive sensor in which the shield layer 317 is not provided, the difference change rate in the case "with a noise" is largely different from that of the case "without a noise" as shown in FIG. 13. Therefore, the pressure-sensitive sensor 303 in which the shield layer 317 is provided can detect the pressing force with a higher accuracy than a pressure-sensitive sensor in which the shield layer 317 is not provided.

In this embodiment, the shield layer 317 is provided between the differential electrode 216 and the circumferential area 5b. For example, when the differential electrode 216 is provided between the fixing portion 4b of the frame 4 and the second electrode 11, the shield layer 317 is provided between the circumferential area 5b of the display cover 5 and the first electrode 10. Also in this case, the same effect as this embodiment can be obtained.

Further, in the pressure-sensitive sensor 303 shown in FIG. 11, a shield layer may be additionally provided between the second electrode 11 and the fixing portion 4b.

<Fourth Embodiment>

Figure 14:
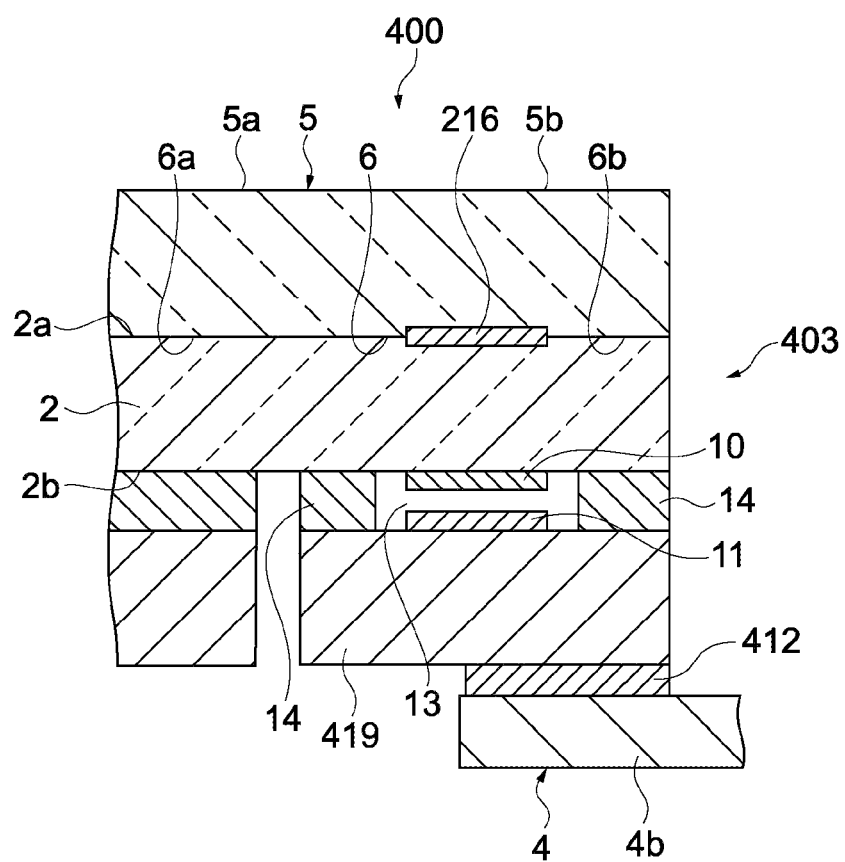
FIG. 14 is a cross-sectional diagram schematically showing a pressure-sensitive sensor of a sensor apparatus according to a fourth embodiment of the present invention.

Next, a sensor apparatus according to a fourth embodiment of the present invention will be described. FIG. 14 is a cross-sectional diagram schematically showing a pressure-sensitive sensor of the sensor apparatus of this embodiment. In a sensor apparatus 400 of this embodiment, the first electrode 10 and the differential electrode 216 are provided while sandwiching the touch panel 2 bonded to the inner surface 6 of the display cover 5.

As shown in FIG. 14, the differential electrode 216 is provided on the upper surface 2a of the touch panel 2. Therefore, the differential electrode 216 is provided between the upper surface 2a of the touch panel 2 and the inner surface 6b of the circumferential area 5b of the display cover 5. The differential electrode 216 may be bonded to the upper surface 2a of the touch panel 2 and the inner surface 6b of the circumferential area 5b via an adhesive, for example. Alternatively, a metal paste or the like printed on the upper surface 2a of the touch panel 2 or the inner surface 6b of the circumferential area 5b may be used as the differential electrode 216.

The first electrode 10 is provided on the lower surface 2b of the touch panel 2 while being opposed to the differential electrode 216. Therefore, the first electrode 10 and the differential electrode 216 are opposed to each other with the touch panel 2 interposed therebetween.

For example, assuming that a capacitance-type panel including two substrates on each of which a transparent electrode pattern is formed is used as the touch panel 2, the first electrode 10 may be formed when forming the transparent electrode pattern on the substrate provided on the lower surface 2b side of the touch panel 2. As a result, workability in forming the first electrode 10 is improved.

On the fixing portion 4b of the frame 4, a support portion 419 formed of, for example, PET is provided via an adhesive 412. The second electrode 11 is provided on the support portion 419. A thickness of the support portion 419 is set as appropriate such that the size of the air gap 13 between the first electrode 10 and the second electrode 11 becomes a desired thickness.

Further, as shown in FIG. 14, the spacers 14 are provided between the lower surface 2b of the touch panel 2 and the support portion 419. In this embodiment, the spacers 14 are provided on both the right- and left-hand sides of the first electrode 10 and the second electrode 11 in FIG. 14. Accordingly, since the size of the air gap 13 between the first electrode 10 and the second electrode 11 can be maintained stably, the pressing force can be detected highly accurately.

In the sensor apparatus 400 of this embodiment, the display cover 5 is deformed so as to be bent at the time the operation area 5a of the display cover 5 is pressed, and the touch panel 2 is also deformed so as to be bent integrally with the display cover 5. Thus, the first electrode 10 provided on the lower surface 2b of the touch panel 2 is moved toward the second electrode 11. As a result, the pressing force applied to the operation area 5a is detected based on the capacitance change between the first electrode 10 and the second electrode 11, that corresponds to the deflection amount of the operation area 5a.

The first electrode 10 and the differential electrode 216 are opposed to each other with the touch panel 2 interposed therebetween. Thus, the capacitance between the first electrode 10 and the differential electrode 216 hardly changes at the time the operation area 5a is pressed.

As a result, the pressing force applied to the operation area 5a is detected accurately based on the change rate of the difference between the capacitance between the first electrode 10 and the second electrode 11 and the capacitance between the first electrode 10 and the differential electrode 216.

Further, in the sensor apparatus 400 of this embodiment, the second electrode 11 is provided on the support portion 419. The first electrode 10 and the differential electrode 216 are respectively provided on the lower surface 2b and upper surface 2a of the touch panel 2.

Therefore, by forming a module including the display cover 5, the touch panel 2, the spacers 14, and the support portion 419, for example, the first electrode 10, the second electrode 11, and the differential electrode 216 can be incorporated into the module. Thus, the touch panel 2 and a pressure-sensitive sensor 403 can be formed integrally, and by attaching the module to the frame 4, the pressure-sensitive sensor 403 can be installed with ease. As a result, workability in producing the sensor apparatus 400 can be improved, and production costs can be reduced.

<Fifth Embodiment>

Figure 15:
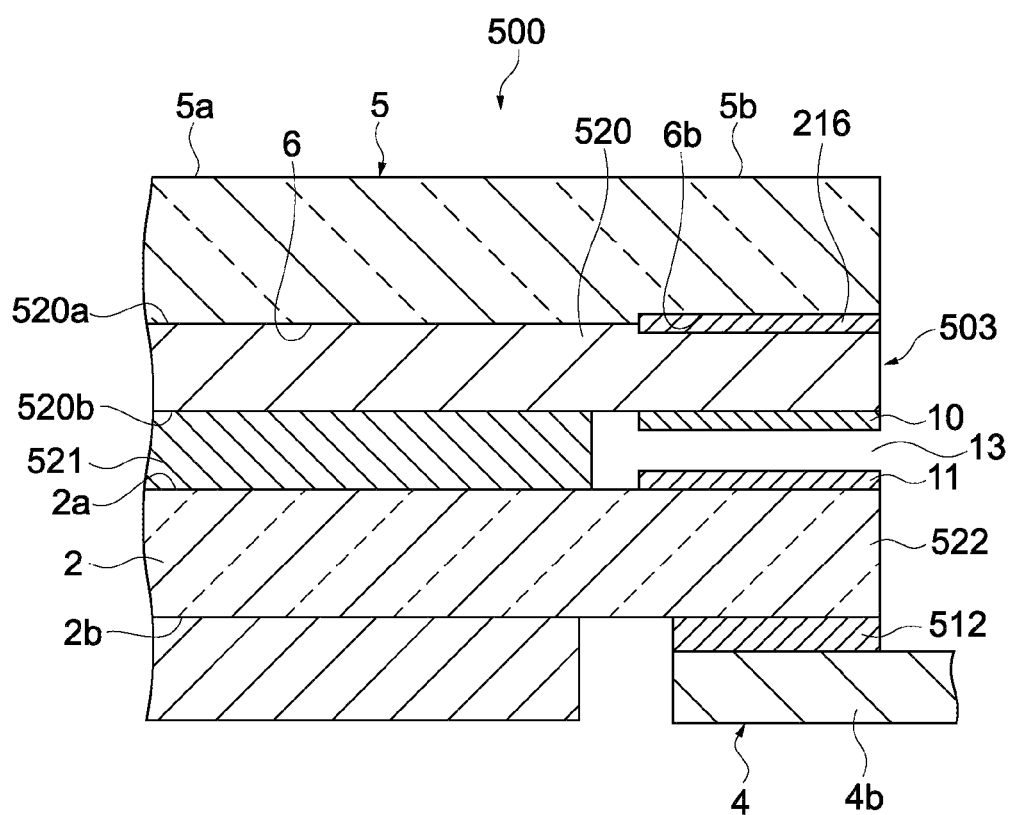
FIG. 15 is a cross-sectional diagram schematically showing a pressure-sensitive sensor of a sensor apparatus according to a fifth embodiment of the present invention.

Next, a sensor apparatus according to a fifth embodiment of the present invention will be described. FIG. 15 is a cross-sectional diagram schematically showing a pressure-sensitive sensor of the sensor apparatus of this embodiment.

In a sensor apparatus 500 of this embodiment, a support portion 520 formed of, for example, PET is bonded to the inner surface 6 of the display cover 5. The inner surface 6 of the display cover 5 and an upper surface 520a of the support portion 520 are bonded as shown in FIG. 15. To a lower surface 520b of the support portion 520, the upper surface 2a of the touch panel 2 is bonded via an adhesive layer 521 formed of, for example, an ultraviolet-curable resin. The lower surface 2b of the touch panel 2 is bonded to the fixing portion 4b of the frame 4 via an adhesive 512.

The first electrode 10 is provided on the lower surface 520b of the support portion 520, and the second electrode 11 is provided on the upper surface 2a of the touch panel 2. Moreover, the differential electrode 216 is provided on the upper surface 520a of the support portion 520 while being opposed to the first electrode 10. The differential electrode 216 is provided between the inner surface 6b of the circumferential area 5b of the display cover 5 and the upper surface 520a of the support portion 520.

In this embodiment, the support portion 520 restricts a change of the distance between the first electrode 10 and the differential electrode 216. Further, the size of the air gap 13 between the first electrode 10 and the second electrode 11 is maintained by the adhesive layer 521. Thus, the support portion 520 and the adhesive layer 521 each have predetermined hardness.

In the sensor apparatus 500 of this embodiment, the display cover 5 is deformed so as to be bent at the time the operation area 5a of the display cover 5 is pressed, and the support portion 520 and the adhesive layer 521 are also deformed so as to be bent integrally with the display cover 5. Thus, the first electrode 10 provided on the lower surface 520b of the support portion 520 is moved toward the second electrode 11.

Moreover, in this embodiment, the touch panel 2 is also deformed so as to be bent integrally with the display cover 5. At this time, a stress acts on a portion 522 of the touch panel 2 that is fixed to the fixing portion 4b toward the display cover 5 from the touch panel 2. Therefore, the touch panel 2 is deformed such that the portion 522 moves toward the display cover 5. Thus, the second electrode 11 provided on the upper surface 2a of the portion 522 is moved toward the first electrode 10.

As described above, if the pressed display cover 5 is deformed to be bent, the distance between the first electrode 10 and the second electrode 11 changes. Accordingly, the pressing force applied to the operation area 5a is detected based on the capacitance change between the first electrode 10 and the second electrode 11, that corresponds to the deflection amount of the display cover 5.

At this time, by detecting the change rate of the difference between the capacitance between the first electrode 10 and the second electrode 11 and the capacitance between the first electrode 10 and the differential electrode 216, the pressing force can be detected accurately.

Further, in the sensor apparatus 500 of this embodiment, the second electrode 11 is provided on the upper surface 2a of the touch panel 2. Furthermore, the first electrode 10 and the differential electrode 216 are respectively provided on the lower surface 520b and upper surface 520a of the support portion 520 bonded to the inner surface 6 of the display cover 5. Therefore, by forming a module including the display cover 5, the support portion 520, the adhesive layer 521, and the touch panel 2, for example, the first electrode 10, the second electrode 11, and the differential electrode 216 can be incorporated into the module. Thus, the touch panel 2 and a pressure-sensitive sensor 503 can be formed integrally, and by attaching the module to the frame 4, the pressure-sensitive sensor 503 can be installed with ease. As a result, workability in producing the sensor apparatus 500 can be improved, and production costs can be reduced.

<Sixth Embodiment>

Figure 16:
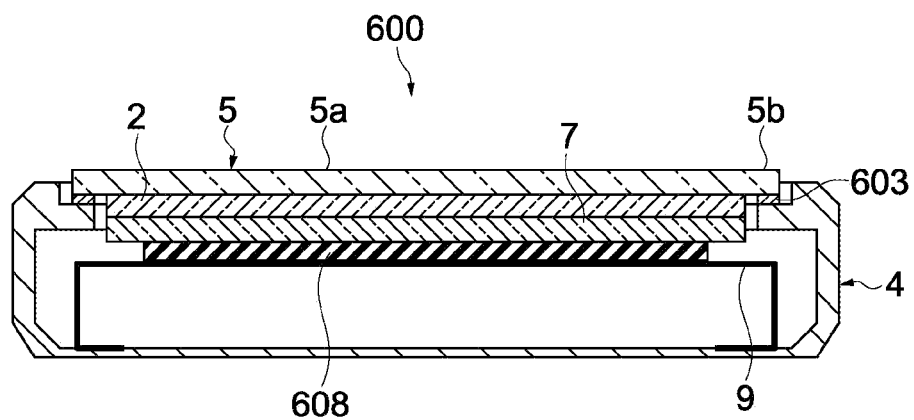
FIG. 16 is a cross-sectional diagram schematically showing a sensor apparatus according to a sixth embodiment of the present invention.
Figure 17:
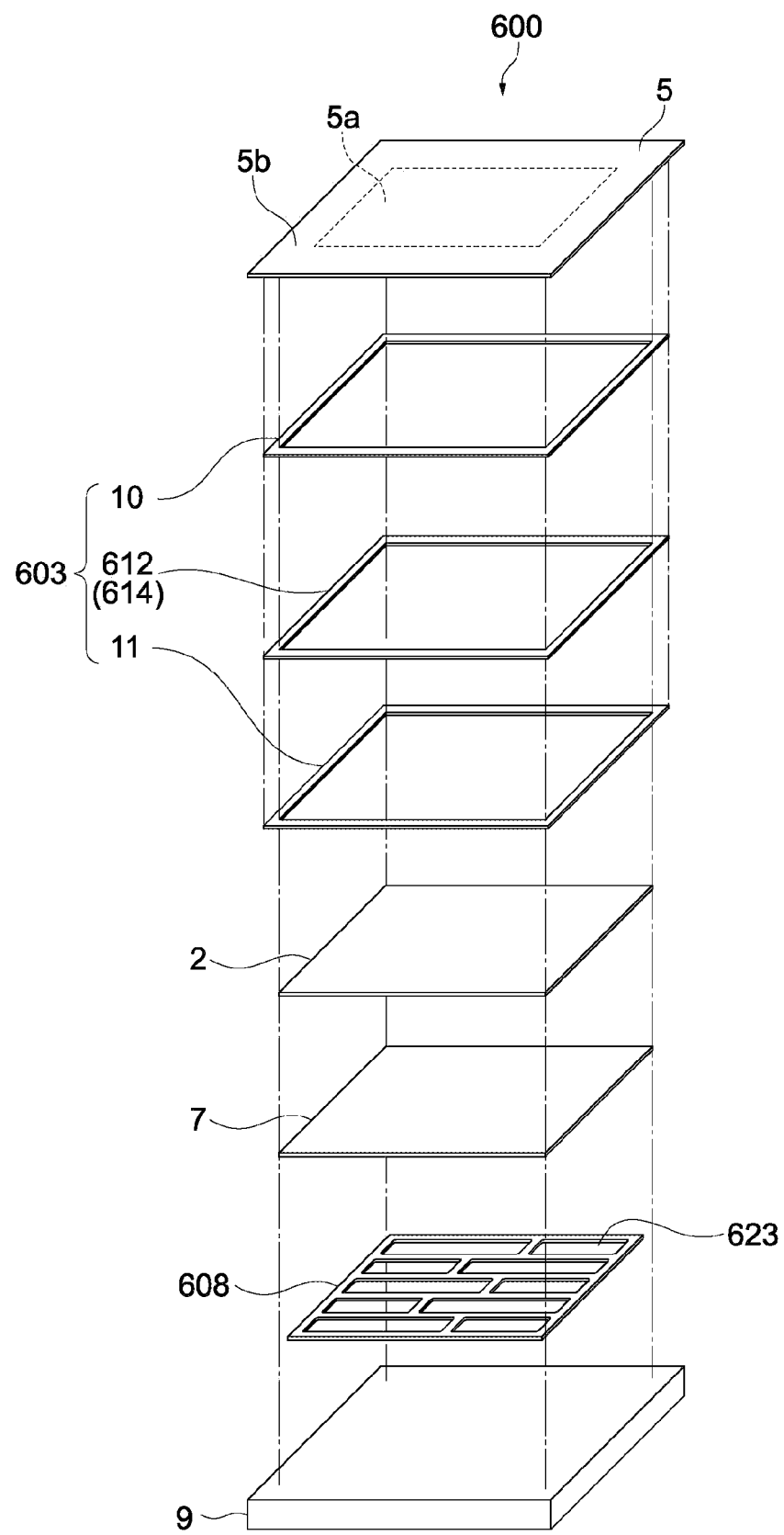
FIG. 17 is an exploded perspective view schematically showing the sensor apparatus shown in FIG. 16.
Figure 18:
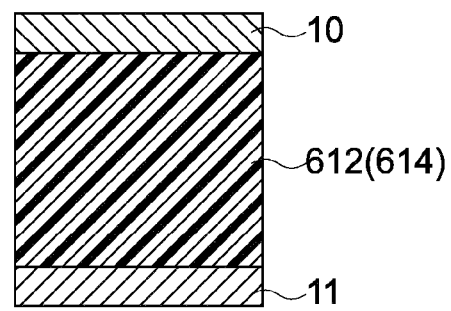
FIG. 18 is a cross-sectional diagram schematically showing a partially-enlarged pressure-sensitive sensor shown in FIG. 16.

FIG. 16 is a cross-sectional diagram schematically showing a sensor apparatus according to a sixth embodiment of the present invention. FIG. 17 is an exploded perspective view schematically showing the sensor apparatus shown in FIG. 16. FIG. 18 is a cross-sectional diagram schematically showing a partially-enlarged pressure-sensitive sensor shown in FIG. 16.

In a sensor apparatus 600 of this embodiment, an adhesive 612 is provided as a spacer 614 between the first electrode 10 and the second electrode 11 as shown in FIGS. 17 and 18. It is also possible to provide the spacer 614 (adhesive 612) between the first electrode 10 and the second electrode 11 as described above. Accordingly, since the distance between the first electrode 10 and the second electrode 11 can be maintained stably, the pressing force can be detected highly accurately. Moreover, it is also possible to provide, as the spacer 614, an elastic body such as rubber between the first electrode 10 and the second electrode 11 to thus improve a restoration speed at a time the pressed operation area 5a is restored to its original shape by its own elastic force. As a result, a reaction speed in detecting a pressing force can be increased.

On the other hand, in the case where a gap between the first electrode 10 and the second electrode 11 becomes an air gap as in the above embodiments, the distance between the first electrode 10 and the second electrode 11 is apt to change at the time the operation area 5a is pressed. Therefore, even when the pressing force applied to the operation area 5a is small and the deflection amount of the display cover 5 is small, the pressing force can be detected with a high sensitivity based on the capacitance change between the first electrode 10 and the second electrode 11.

Which of the spacer 614 and an air gap is to be provided between the first electrode 10 and the second electrode 11 only needs to be set as appropriate based on desired characteristics of the sensor apparatus.

Further, it is also possible to use, for example, an adequate elastic member as a cushion member 608 provided between the display panel 7 and the metal shield 9 as shown in FIGS. 16 and 17 to thus improve a speed at which the display cover 5 returns to its original shape. In this embodiment, "PORON" (registered trademark) available from ROGERS INOAC CORPORATION is used as such an elastic member.

It is also possible to appropriately adjust an elastic force of the cushion member 608 by forming through-holes 623 on the rectangular cushion member 608 as shown in FIG. 17.

<Seventh Embodiment>

Figure 19:
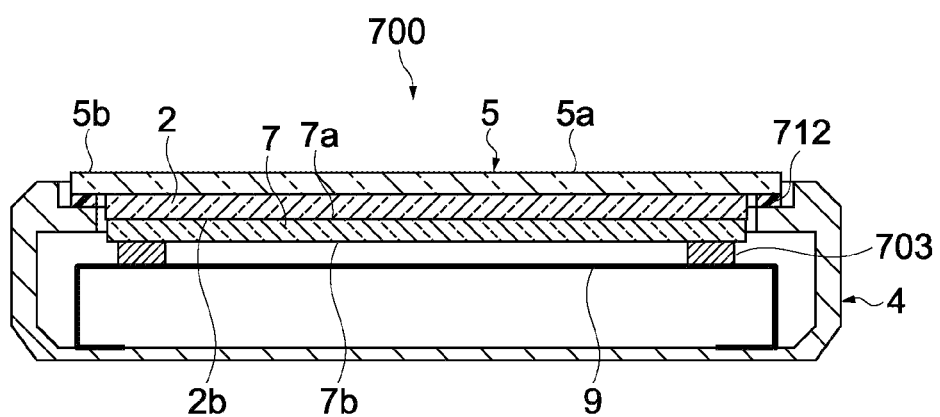
FIG. 19 is a cross-sectional diagram schematically showing a sensor apparatus according to a seventh embodiment of the present invention.
Figure 20:
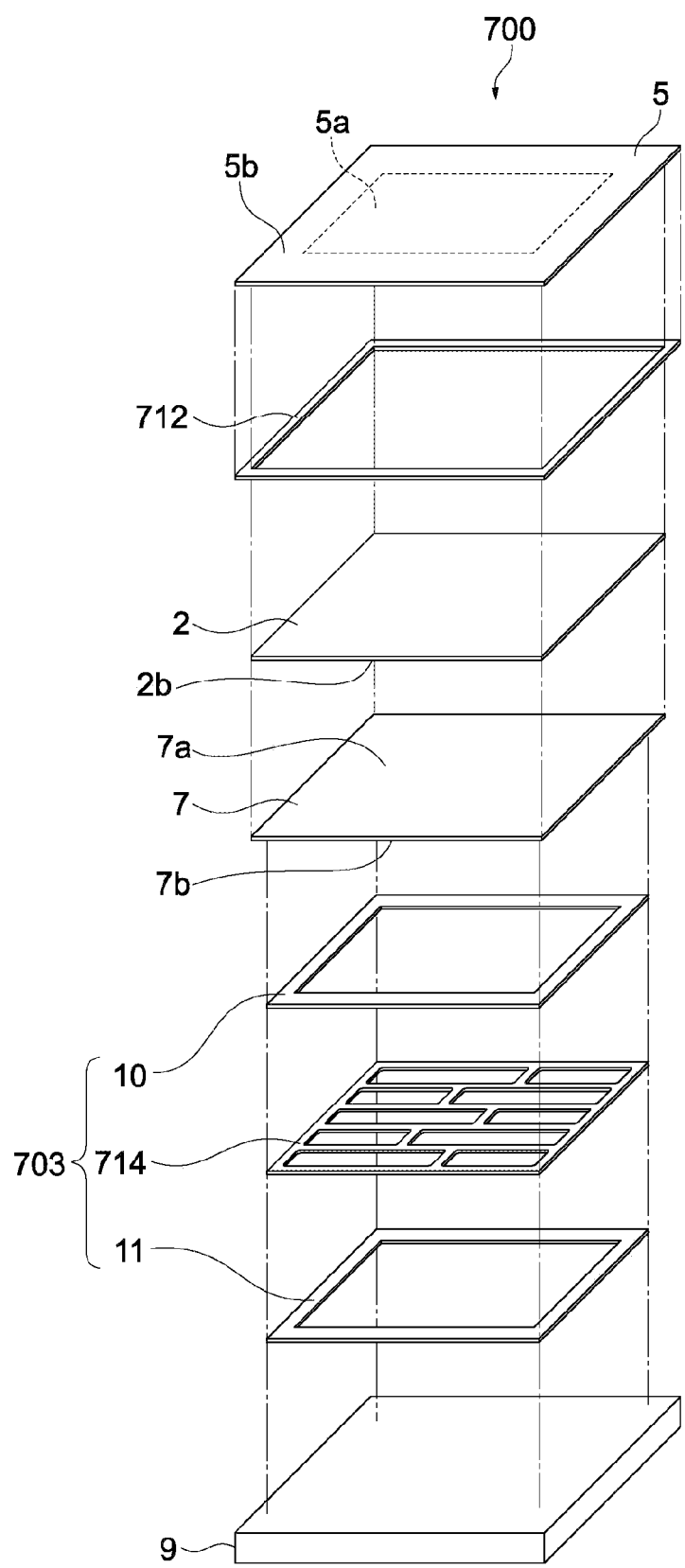
FIG. 20 is an exploded perspective view schematically showing the sensor apparatus shown in FIG. 19.

FIG. 19 is a cross-sectional diagram schematically showing a sensor apparatus according to a seventh embodiment of the present invention. FIG. 20 is an exploded perspective view schematically showing the sensor apparatus shown in FIG. 19.

As shown in FIGS. 19 and 20, in a sensor apparatus 700 of this embodiment, an upper surface 7a (first surface) of the display panel 7 is bonded to the lower surface 2b of the touch panel 2, and a pressure-sensitive sensor 703 is provided on a lower surface 7b (second surface) of the display panel 7. The display cover 5 is fixed to the frame 4 by an annularly-formed adhesive 712.

As shown in FIG. 20, the first electrode 10 and the second electrode 11 are provided on the lower surface 7b of the display panel 7 and the metal shield 9, respectively. A spacer 714 is provided between the first electrode 10 and the second electrode 11. Although a rectangular "PORON" is used as the spacer 714 in this embodiment, the spacer is not limited thereto. A spacer that is annular in the same manner as the first electrode 10 and the second electrode 11 may be used as the spacer 714, for example. It should be noted that in FIG. 19, an illustration of the spacer 714 is omitted.

In the sensor apparatus 700 of this embodiment, the display cover 5 is deformed so as to be bent at the time the operation area 5a of the display cover 5 is pressed, and the touch panel 2 and the display panel 7 are also deformed so as to be bent integrally with the display cover 5. As a result, the pressing force applied to the operation area 5a is detected based on the capacitance change between the first electrode 10 and the second electrode 11, that corresponds to the deflection amount of the display cover 5.

FIG. 21 are diagrams showing other examples of the shape of the first electrode 10 and the second electrode 11, and the like of this embodiment. FIG. 21 show the first electrode 10 and the second electrode 11 provided on the lower surface 7b of the display panel 7. The spacer 714 (not shown) is set as appropriate based on the shape of the first electrode 10 and the second electrode 11, and the like.

Figure 21A:
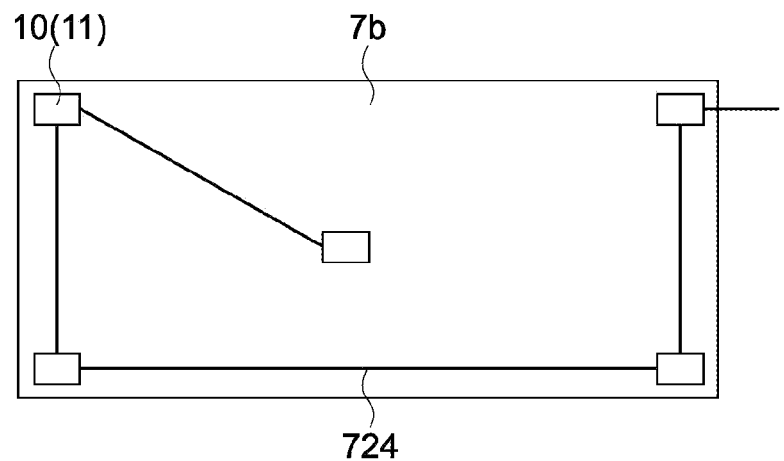
FIG. 21 are diagrams showing other examples of a shape and the like of a pressure-sensitive sensor according to the seventh embodiment.

As shown in FIG. 21A, a plurality of first electrodes 10 and second electrodes 11 may be provided at positions corresponding to four corners of the display cover 5 and a position corresponding to the center of the operation area 5a. The plurality of first electrodes 10 and second electrodes 11 are electrically connected to one another by a wiring 724. Accordingly, the pressing force can be detected highly accurately irrespective of the pressing position of the operation area 5a.

Figure 21B:
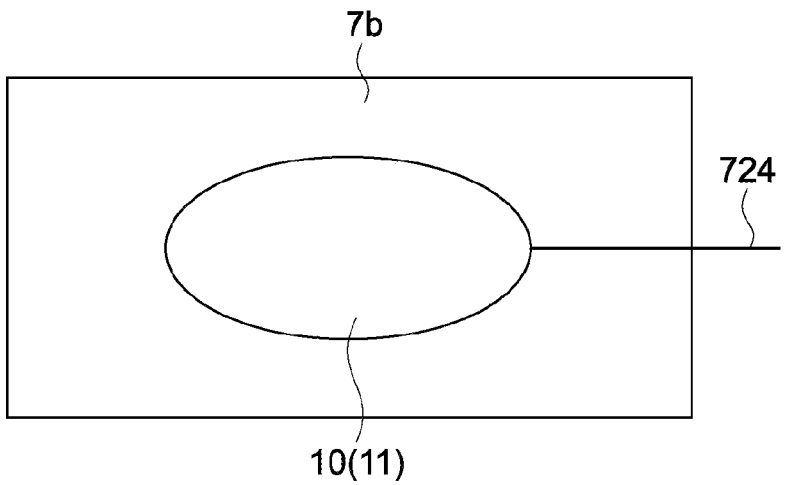

As shown in FIG. 21B, the first electrode 10 and the second electrode 11 may be provided in a predetermined area at a position corresponding to the center of the operation area 5a. By increasing the areas of the first electrode 10 and the second electrode 11, for example, the pressing force can be detected highly accurately irrespective of the pressing position of the operation area 5a.

In this embodiment, by the display panel 7, an image is displayed in the operation area 5a. As shown in FIGS. 19 and 20, the operation area 5a is located on the upper surface 7a side when seen from the display panel 7. Therefore, the pressure-sensitive sensor 703 provided on the lower surface 7b of the display panel 7 does not block the display of an image on the display panel 7. Accordingly, a degree of freedom of the shape and number of the pressure-sensitive sensor 703 (first electrode 10 and second electrode 11), the position of the pressure-sensitive sensor 703 with respect to the display panel 7, and the like increases. In particular, the pressure-sensitive sensor 703 can be provided at a position corresponding to the center of the operation area 5a of the display cover 5 as shown in FIGS. 21A and 21B.

Moreover, since the pressure-sensitive sensor 703 is provided on the lower surface 7b of the display panel 7, the structures of the display cover 5, the touch panel 2, and the display panel 7 can be set as appropriate such that favorable optical characteristics can be obtained irrespective of the position at which the pressure-sensitive sensor 703 is installed.

<Eighth Embodiment>

Figure 22:
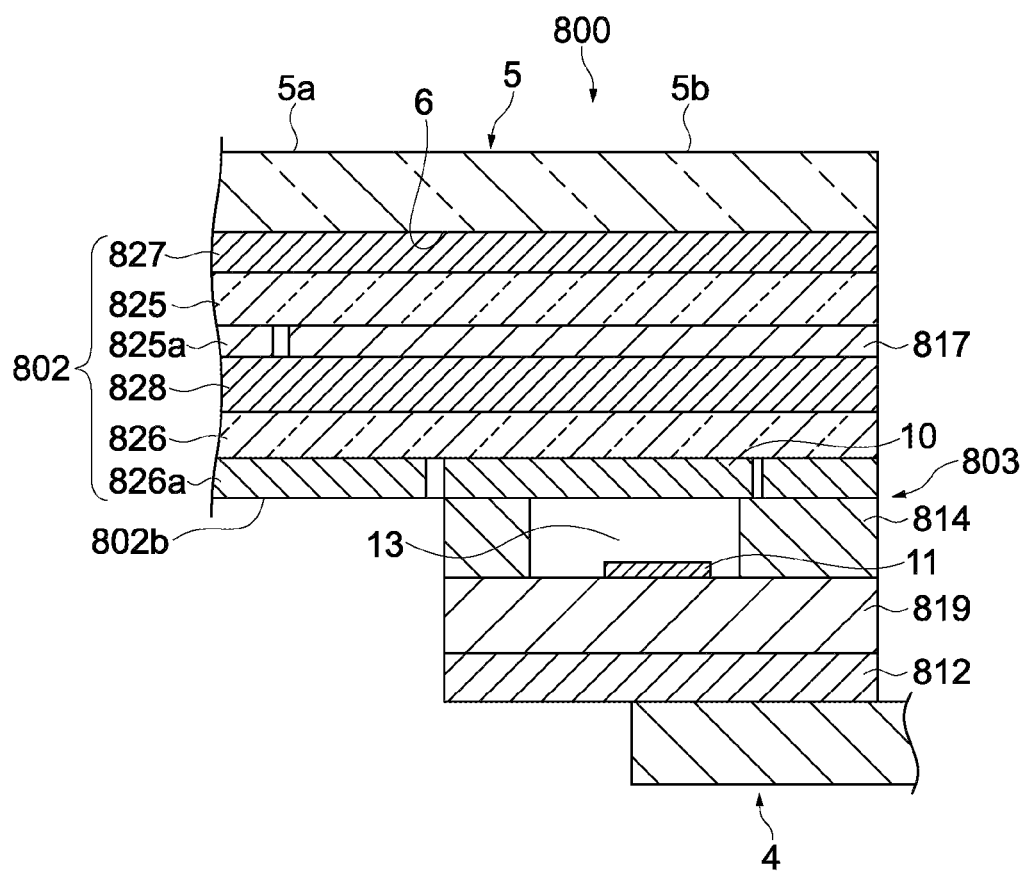
FIG. 22 is a cross-sectional diagram schematically showing a pressure-sensitive sensor of a sensor apparatus according to an eighth embodiment of the present invention.

FIG. 22 is a cross-sectional diagram schematically showing a pressure-sensitive sensor of a sensor apparatus according to an eighth embodiment of the present invention.

Figure 23:
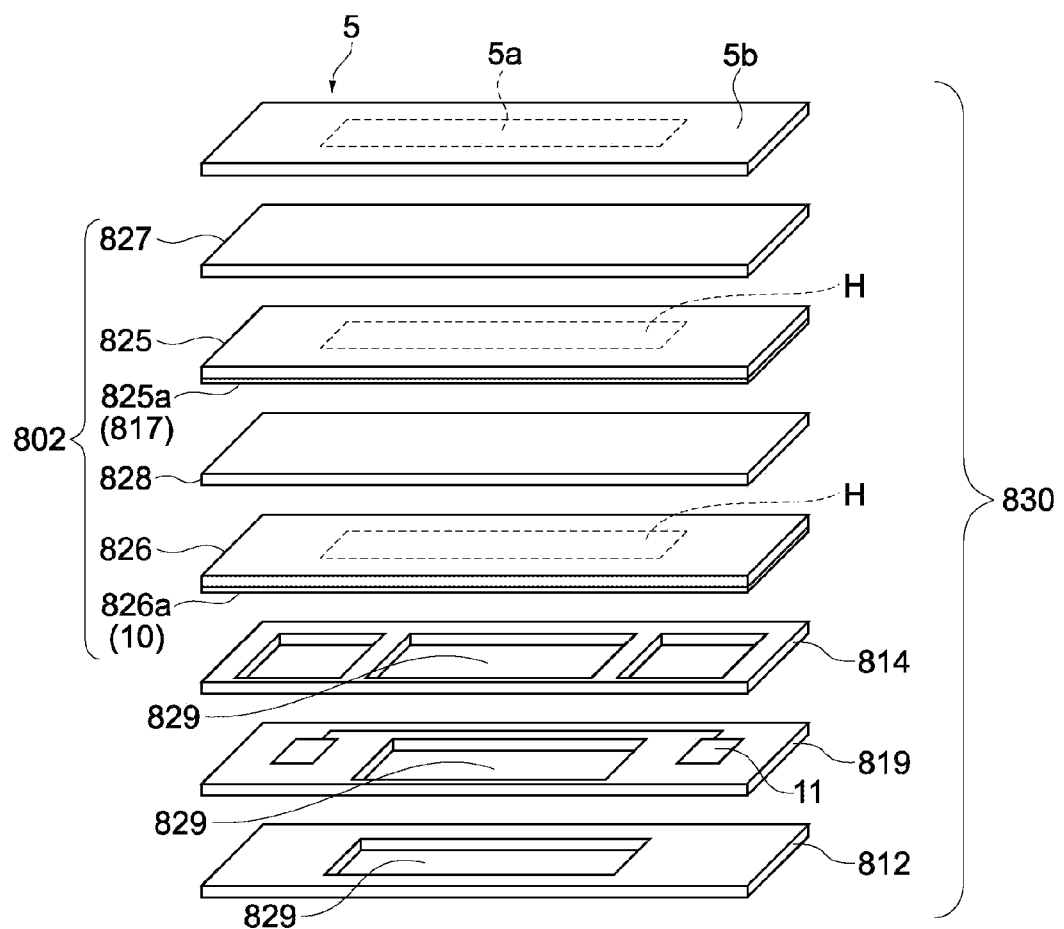
FIG. 23 is an exploded perspective view schematically showing the sensor apparatus according to the eighth embodiment.

FIG. 23 is an exploded perspective view schematically showing the sensor apparatus of this embodiment.

In this embodiment, a capacitance-type touch panel 802 is used. As shown in FIG. 22, the touch panel 802 includes an X electrode substrate 825 on which an X transparent electrode pattern for detection 825a is formed and a Y electrode substrate 826 on which a Y transparent electrode pattern for detection 826a is formed. The X electrode substrate 825 is bonded to the inner surface 6 of the display cover 5 by an adhesive 827, and the Y electrode substrate 826 is bonded to the X electrode substrate 825 by an adhesive 828. The X electrode substrate 825 and the Y electrode substrate 826 are arranged such that the X transparent electrode pattern for detection 825a and the Y transparent electrode pattern for detection 826a face a lower surface 802b side of the touch panel 802.

The X electrode substrate 825 and the Y electrode substrate 826 are each constituted of a transparent material such as a PET substrate. For the X transparent electrode pattern for detection 825a formed on the X electrode substrate 825, ITO that extends in one direction as stripes is used, for example.

Also on the Y electrode substrate 826, ITO that extends in one direction as stripes is formed as the Y transparent electrode pattern for detection 826a. The Y transparent electrode pattern for detection 826a is formed such that the extension direction thereof becomes substantially orthogonal to the extension direction of the X transparent electrode pattern for detection 825a.

An area where the X transparent electrode pattern for detection 825a and the Y transparent electrode pattern for detection 826a overlap each other within a plane becomes a coordinate detection area H corresponding to the operation area 5a. When the operator is brought into contact with the operation area 5a, a capacitance changes locally in the coordinate detection area H. By the detection of the local capacitance change, XY coordinates of a position at which the operator is brought into contact is specified.

As shown in FIG. 22, in this embodiment, a shield layer 817 is formed on the X electrode substrate 825. In addition, the first electrode 10 is formed on the Y electrode substrate 826. The shield layer 817 is formed simultaneous with the X transparent electrode pattern for detection 825a. In addition, the first electrode 10 is formed simultaneous with the Y transparent electrode pattern for detection 826a. Thus, the shield layer 817 and the first electrode 10 are each formed of ITO. Since the shield layer 817 and the first electrode 10 are formed simultaneous with the transparent electrode patterns, workability in forming the shield layer 817 and the first electrode 10 is improved.

As shown in FIG. 23, a spacer 814, a support portion 819 on which the second electrode 11 is formed, and an adhesive 812 are bonded to the Y electrode substrate 826 in the stated order. A display window 829 is formed on each of the spacer 814, the support portion 819, and the adhesive 812 for displaying an image in the operation area 5a by the display panel (not shown).

The display cover 5, the touch panel 802, the spacer 814, the support portion 819, and the adhesive 812 shown in FIG. 23 constitute a module 830. Accordingly, the touch panel 802 and a pressure-sensitive sensor 803 can be formed integrally, and by attaching the module 830 to the frame 4, the pressure-sensitive sensor 803 can be installed with ease. As a result, workability in producing the sensor apparatus 800 can be improved, and production costs can be reduced.

It should be noted that although the shield layer 817 is formed on the X electrode substrate 825 in this embodiment, the differential electrode described in the second embodiment and the like may be formed in place of the shield layer 817. In addition, the pressing force applied to the operation area 5a may be detected based on the "difference change rate" described above.

The structure of the touch panel 802 is not limited to that described in this embodiment. For example, the X electrode substrate 825 and the Y electrode substrate 826 may be arranged such that the X transparent electrode pattern for detection 825a and the Y transparent electrode pattern for detection 826a face the display cover 5 side.

Alternatively, the X electrode substrate 825 and the Y electrode substrate 826 may be arranged such that the X transparent electrode pattern for detection 825a faces the display cover 5 side and the Y transparent electrode pattern for detection 826a faces the lower surface 802b side. Alternatively, the X electrode substrate 825 and the Y electrode substrate 826 may be arranged such that the X transparent electrode pattern for detection 825a and the Y transparent electrode pattern for detection 826a face each other.

<Ninth Embodiment>

Figure 24:
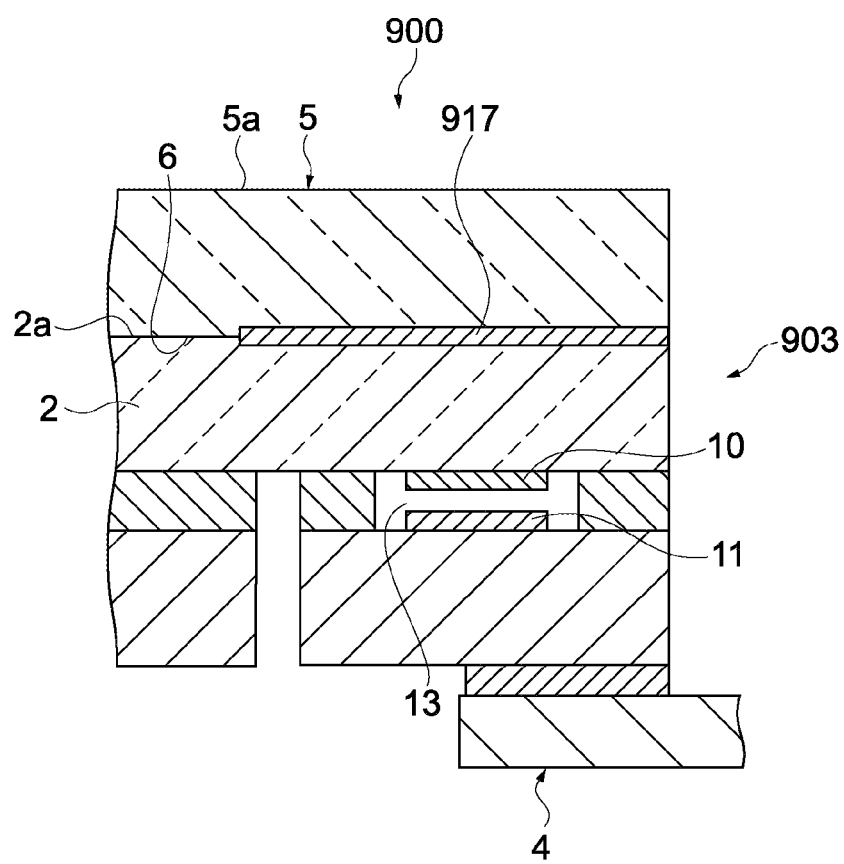
FIG. 24 is a cross-sectional diagram schematically showing a pressure-sensitive sensor of a sensor apparatus according to a ninth embodiment of the present invention.

FIG. 24 is a cross-sectional diagram schematically showing a pressure-sensitive sensor of a sensor apparatus according to a ninth embodiment of the present invention.

As shown in FIG. 24, in this embodiment, a shield layer 917 is formed on the upper surface 2a of the touch panel 2. The shield layer 917 is a layer in which a conductive ink is printed on the inner surface 6 of the display cover 5. Used as the conductive ink is an ink containing a conductive material such as gold, silver, and copper. As a printing method, gravure printing, offset printing, inkjet printing, screen printing, or the like is used.

As described above, a layer on which a conductive ink is printed may be used as the shield layer 917. By the shield layer 917, a capacitance change between the first electrode 10 and the second electrode 11 at the time a finger or the like approaches the operation area 5a can be suppressed.

Moreover, since the shield layer 917 is printed on the inner surface 6 of the display cover 5 in this embodiment, the shield layer 917 can be made visible on the surface of the display cover 5. Therefore, by appropriately setting a shape and color of the shield layer 917 for decoration, design of a sensor apparatus 900 can be improved.

<Tenth Embodiment>

Figure 25:
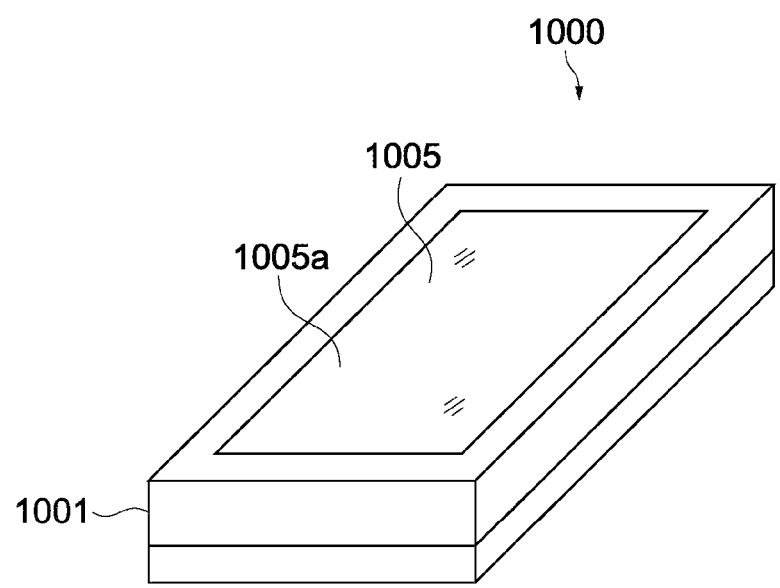
FIG. 25 is a perspective view schematically showing an electronic apparatus according to a tenth embodiment of the present invention.

FIG. 25 is a perspective view schematically showing an electronic apparatus 1000 according to a tenth embodiment of the present invention. In the electronic apparatus 1000, a control unit to be described later is incorporated into the sensor apparatus according to any of the above embodiments.

When an operation area 1005a of a display cover 1005 is pressed by an operator such as a finger, the control unit causes the electronic apparatus 1000 to perform a predetermined operation based on a pressing position and a pressing force. In other words, the control unit is capable of processing a signal on a contact position of the operator detected by a touch panel provided inside a casing 1001 and a signal on a pressing force of the operator detected by a pressure-sensitive sensor provided inside the casing 1001.

For example, by the control unit, a plurality of buttons are displayed as an image in the operation area 1005a. When a button is pressed by a user, the control unit judges which of the buttons has been pressed based on a pressing position and pressing force of the operator. Then, the control unit causes an image corresponding to the button judged to have been pressed to be displayed in the operation area 1005a, for example. Alternatively, an application corresponding to the button judged to have been pressed may be activated.

In this embodiment, the control unit includes an operation circuit that detects a capacitance change between the first and second electrodes, and the like. The control unit detects a pressing force applied to the operation area 1005a.

For example, the control unit may be realized by hardware or both software and hardware. The hardware typically includes a CPU (Central Processing Unit), an MPU (Micro Processing Unit), a RAM (Random Access Memory), a ROM (Read Only Memory), a DSP (Digital Signal Processor), an FPGA (Field Programmable Gate Array), an ASIC (Application Specific Integrated Circuit), a NIC (Network Interface Card), and a WNIC (Wireless NIC). Various programs constituting the software are stored in a ROM or other storage devices.

Examples of such an electronic apparatus 1000 include an image pickup apparatus such as a digital camera and a digital video camera, a terminal apparatus such as a cellular phone and a portable audiovisual apparatus, a portable game apparatus, a PDA (Personal Digital Assistance), an on-screen keyboard, an electronic dictionary, a display apparatus, an audiovisual apparatus, a projector, a game apparatus, a robot apparatus, and other electrical appliances.

<Modified Example>

The present invention is not limited to the above embodiments and can be variously modified without departing from the gist of the present invention.

For example, FIG. 26 are diagrams showing modified examples of the shape and the like of the first electrode 10 and the second electrode 11 according to the first embodiment. Here, the first electrode 10 and the second electrode 11 provided on the inner surface 6b of the circumferential area 5b of the display cover 5 are illustrated.

Figure 26A:
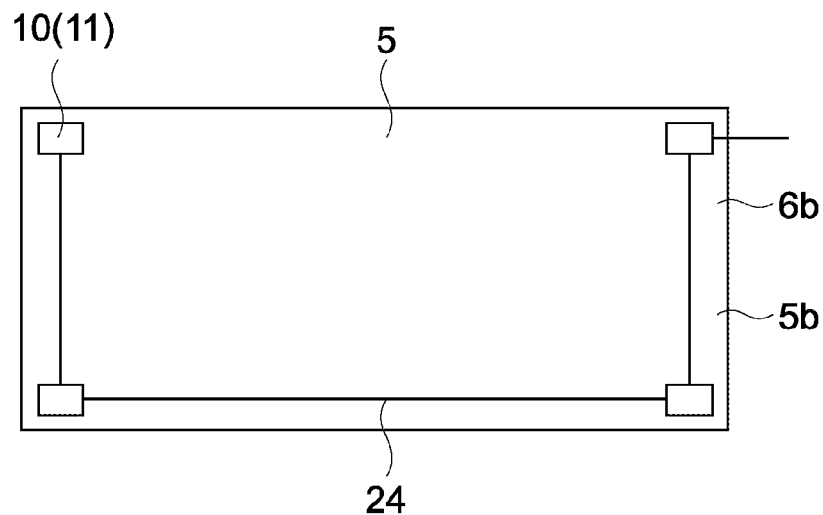
FIG. 26 are diagrams showing modified examples of a shape and the like of a first electrode and a second electrode according to the first embodiment.

As shown in FIG. 26A, a plurality of first electrodes 10 and second electrodes 11 may be provided at positions corresponding to the four corners of the display cover 5. The plurality of first electrodes 10 and second electrodes 11 are electrically connected to one another by a wiring 24.

Figure 26B:
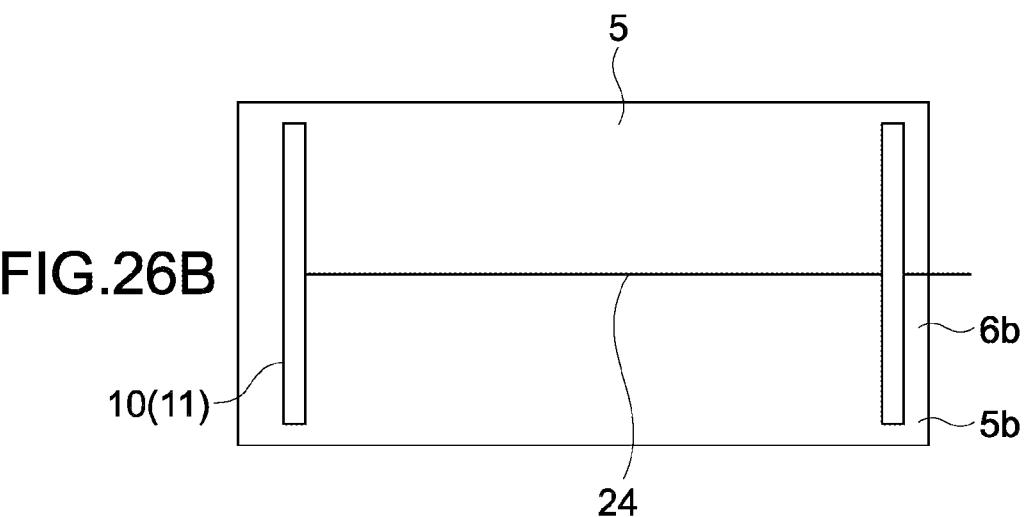

Alternatively, the first electrode 10 and the second electrode 11 may be provided at positions corresponding to two opposing sides of the display cover 5 as shown in FIG. 26B. When the first electrode 10 and the second electrode 11 are provided as shown in FIGS. 26A and 26B, the pressing force can be detected highly accurately irrespective of the pressing position of the operation area 5a as in the case of the annularly-formed first electrode 10 and second electrode 11 described in the first embodiment.

Further, when the first electrode 10 and the second electrode 11 are formed as shown in FIG. 26A or 26B, an amount of conductive material to be used for the first electrode 10 and the second electrode 11 can be reduced. Therefore, component costs can be reduced. On the other hand, when the first electrode 10 and the second electrode 11 are formed annularly as described in the first embodiment, the amount of wiring 24 from the first electrode 10 and the second electrode 11 can be reduced. As a result, the structure of the sensor apparatus 100 can be simplified. It should be noted that the modified example described herein is also applicable to the other embodiments described above.

It should be noted that the first electrode 10 and the second electrode 11 may be provided on two long sides of the display cover 5 in FIG. 26B. Alternatively, the first electrode 10 and the second electrode 11 may be formed on, for example, two long sides and one short side of the display cover 5. In other words, the first electrode 10 and the second electrode 11 may be formed on three sides of the display cover 5.

Further, the first electrode 10 and the second electrode 11 may be formed on one side of the display cover 5. For example, in a case where an icon is displayed only in an area along one side of the display cover 5, if the first electrode 10 and the second electrode 11 are formed on that one side, a pressing force with respect to the icon can be detected. As described above, the first electrode 10 and the second electrode 11 may be formed in predetermined areas.

Figure 27:
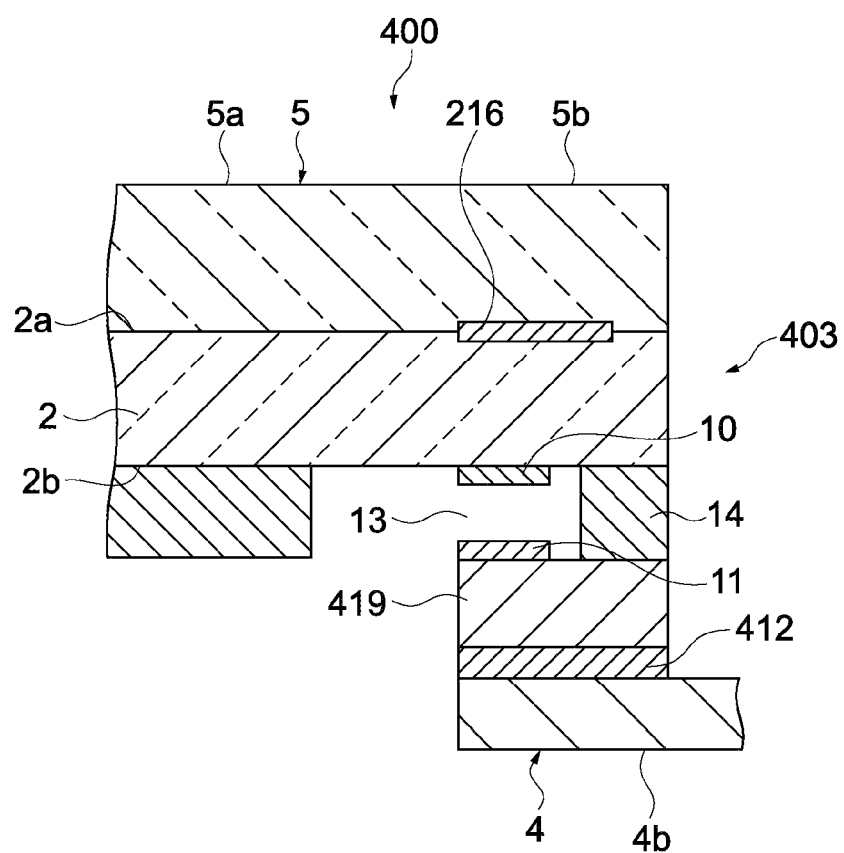
FIG. 27 is a diagram showing a modified example of the sensor apparatus according to the fourth embodiment shown in FIG. 14.

FIG. 27 is a diagram showing a modified example of the sensor apparatus according to the fourth embodiment shown in FIG. 14. In the pressure-sensitive sensor 403 of the sensor apparatus 400, the spacer 14 is provided only on one side of the first electrode 10 and the second electrode 11 (right-hand side in FIG. 27). When the spacer 14 is provided only on one side of the first electrode 10 and the second electrode 11 as described above, the distance between the first electrode 10 and the second electrode 11 is apt to change. Therefore, a pressing force with respect to the operation area 5a can be detected with a high sensitivity. Whether to provide the spacer 14 on both sides of the first electrode 10 and the second electrode 11 or one side of the first electrode 10 and the second electrode 11 only needs to be set as appropriate based on desired characteristics of the sensor apparatus.

Figure 28:
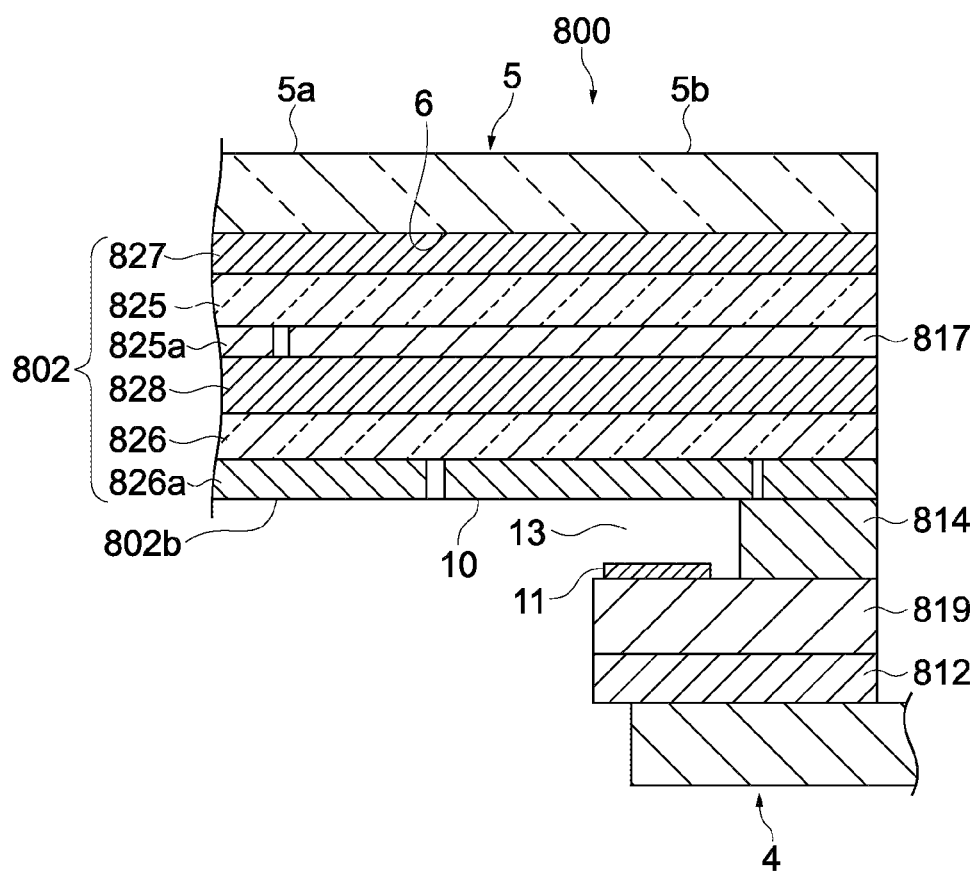
FIG. 28 is a diagram showing a modified example of the sensor apparatus according to the eighth embodiment shown in FIG. 22.
Figure 29:
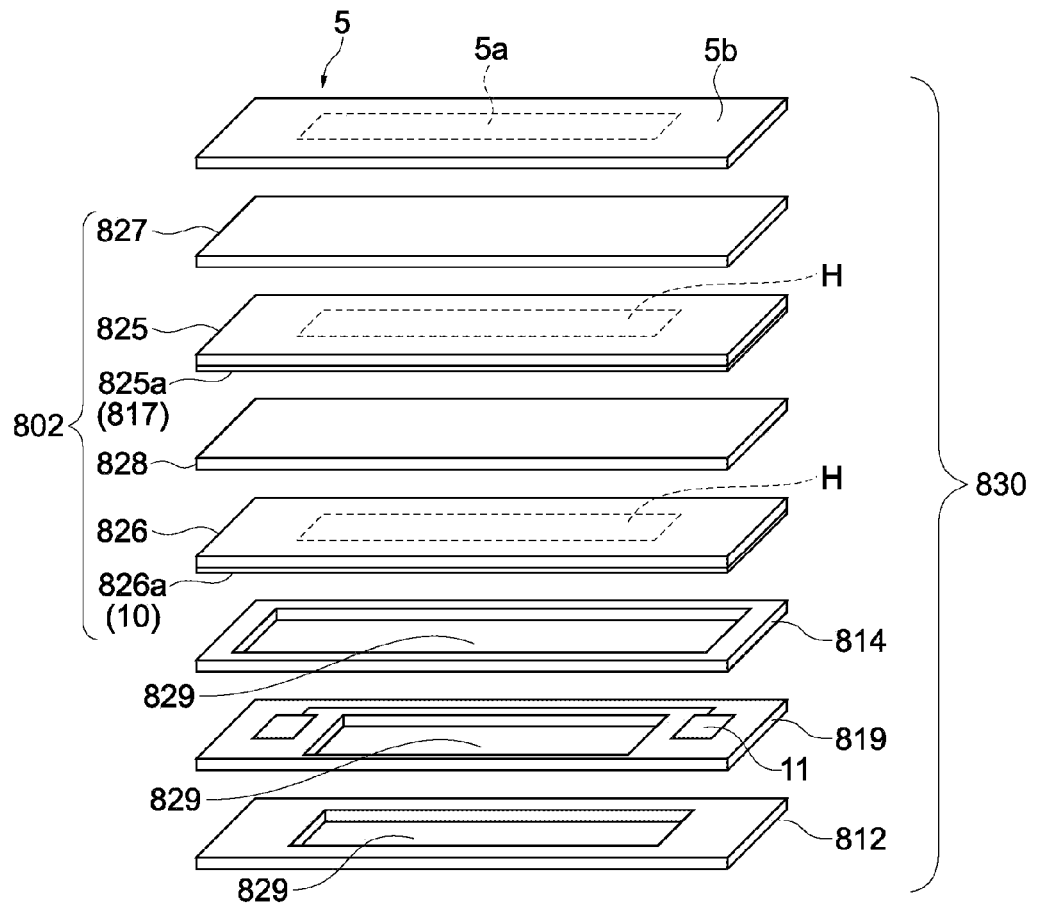
FIG. 29 is a diagram showing a modified example of the sensor apparatus according to the eighth embodiment shown in FIG. 23.

FIGS. 28 and 29 are diagrams showing modified examples of the sensor apparatus according to the eighth embodiment shown in FIGS. 22 and 23. Also in the sensor apparatus 800, the spacer 814 is formed only on one side of the first electrode 10 and the second electrode 11 (right-hand side of FIG. 28) as in the sensor apparatus 400 shown in FIG. 27.

Thus, an area of the display window 829 in the case of the spacer 814 shown in FIG. 29 can be made larger than that in the case of the spacer 814 shown in FIG. 23. As a result, an image having a large area can be displayed on the display panel.

In the above embodiments, the display cover has been rectangular. However, the shape of the display cover is not limited to a rectangle and may take any shape such as a circle, an oval, and a polygon. Moreover, shapes of the operation area and the circumferential area can also be set as appropriate. Furthermore, an area where the operation area and the circumferential area overlap may be formed on the display cover. For example, when the entire display cover fixed to the frame is pressed by an operator, the entire display cover corresponds to the operation area, and a part thereof fixed to the frame also corresponds to the circumferential area.

The shape of the frame can also be set as appropriate. The frame only needs to be formed in a shape corresponding to the various electronic apparatuses described in the tenth embodiment.

The present application contains subject matter related to that disclosed in Japanese Priority Patent Application JP 2009-255530 filed in the Japan Patent Office on Nov. 6, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A sensor apparatus, comprising:
    a display cover including an operation area that flexes in response to a pressing force of an operator on the operation area and a circumferential area located on the circumference of the operation area;
    a frame including an opening covered by the operation area and a fixing portion extending inwardly from an outer portion of the frame and arranged to fix the circumferential area of the display cover, wherein the outer portion of the frame does not support, above the outer portion, the circumferential area of the display cover, wherein a joint of the circumferential area and the fixing portion is configured to act as a fulcrum in response to the pressing force of the operator on the operation area, wherein the fixing portion of the frame is arranged to support above the fixing portion, a pressure-sensitive sensor and the circumferential area of the display cover;
    a touch panel, which is supported by the display cover, wherein the touch panel is configured to detect a position at which the operator comes into contact with the operation area; and
    the pressure-sensitive sensor, which is provided between the display cover and the fixing portion of the frame, wherein the pressure-sensitive sensor includes a first electrode, a second electrode opposed to the first electrode, wherein the second electrode is connected to the fixing portion of the frame via an adhesive, and a spacer provided between the display cover and the fixing portion of the frame to create a gap between the first electrode and the second electrode, and wherein the pressure-sensitive sensor is configured to detect a pressing force with respect to the operation area based, at least in part, on a change of a capacitance between the first electrode and the second electrode that corresponds to a deflection amount of the display cover.

2. The sensor apparatus according to claim 1,
wherein the pressure-sensitive sensor further includes
the first electrode provided in the circumferential area,
the second electrode provided on the fixing portion, and
the spacer provided between the circumferential area and the fixing portion.

3. The sensor apparatus according to claim 2,
wherein the pressure-sensitive sensor further includes
a third electrode provided between the first electrode and the circumferential area while being opposed to the first electrode,
a connection layer, which is provided between the first electrode and the third electrode, to restrict a change of a distance between the first electrode and the third electrode, and
an operation circuit to detect a change rate of a difference between the capacitance between the first electrode and the second electrode and a second capacitance between the first electrode and the third electrode.

4. The sensor apparatus according to claim 3,
wherein the pressure-sensitive sensor further includes a conductive layer that is provided between the third electrode and the circumferential area while being opposed to the third electrode and to which a ground potential is connected.

5. The sensor apparatus according to claim 2,
wherein the pressure-sensitive sensor further includes
a third electrode provided between the second electrode and the fixing portion while being opposed to the second electrode,
a connection layer, which is provided between the second electrode and the third electrode, to restrict a change of a distance between the second electrode and the third electrode, and
an operation circuit to detect a change rate of a difference between the capacitance between the first electrode and the second electrode and a second capacitance between the second electrode and the third electrode.

6. The sensor apparatus according to claim 5,
wherein the pressure-sensitive sensor further includes a conductive layer that is provided between the first electrode and the circumferential area while being opposed to the first electrode and to which a ground potential is connected.

7. The sensor apparatus according to claim 1,
wherein the touch panel includes a first surface fixed to the display cover and a second surface provided on the other side of the first surface, and
wherein the pressure-sensitive sensor further includes
the first electrode provided on the second surface,
the second electrode provided on the fixing portion,
a third electrode provided on the first surface while being opposed to the first electrode, and
an operation circuit to detect a change rate of a difference between the capacitance between the first electrode and the second electrode and a second capacitance between the first electrode and the third electrode.

8. The sensor apparatus according to claim 1,
wherein the touch panel includes a first surface fixed to the display cover and a second surface provided on the other side of the first surface, and
wherein the pressure-sensitive sensor further includes
the first electrode provided on the second surface,
the second electrode provided on the fixing portion, and
a conductive layer that is provided on the first surface while being opposed to the first electrode and to which a ground potential is connected.

9. The sensor apparatus according to claim 8,
wherein the first electrode and the second electrode are formed annularly along an edge of the display cover.

10. The sensor apparatus according to claim 1,
wherein the display cover is rectangular, and
wherein the first electrode and the second electrode are provided on at least one side of the display cover.

11. The sensor apparatus according to claim 1,
wherein the gap between the first electrode and the second electrode includes, at least in part, an air gap.

12. The sensor apparatus according to claim 1, further comprising
a display panel including a first surface fixed to the touch panel and a second surface provided on the other side of the first surface,
wherein the pressure-sensitive sensor is provided on the second surface.

13. The sensor apparatus according to claim 1, wherein the gap is greater than or equal to 10 μm and less than or equal to 30 μm when the pressing force of an operator is not applied to the operation area.

14. The sensor apparatus according to claim 1, wherein the spacer comprises an adhesive.

15. The sensor apparatus according to claim 1, wherein at least a portion of the spacer does not change thickness in response to the pressing force of the operator applied to the operation area.

16. An electronic apparatus comprising:
a display cover including an operation area that flexes in response to a pressing force of an operator on the operation area and a circumferential area located on the circumference of the operation area;
a frame including an opening covered by the operation area and a fixing portion extending inwardly from an outer portion of the frame and arranged to fix the circumferential area of the display cover, wherein the outer portion of the frame does not support, above the outer portion, the circumferential area of the display cover, wherein a joint of the circumferential area and the fixing portion is configured to act as a fulcrum in response to the pressing force of the operator on the operation area, wherein the fixing portion of the frame is arranged to support above the fixing portion, a pressure-sensitive sensor and the circumferential area of the display cover;
a touch panel, which is supported by the display cover, wherein the touch panel is configured to detect a position at which the operator comes into contact with the operation area;
the pressure-sensitive sensor, which is provided between the display cover and the fixing portion of the frame, wherein the pressure-sensitive sensor includes a first electrode, a second electrode opposed to the first electrode, wherein the second electrode is connected to the fixing portion of the frame via an adhesive, and a spacer provided between the display cover and the fixing portion of the frame to create a gap between the first electrode and the second electrode, and wherein the pressure-sensitive sensor is configured to detect a pressing force with respect to the operation area based, at least in part, on a change of a capacitance between the first electrode and the second electrode that corresponds to a deflection amount of the display cover; and a control unit configured to process a first signal received from the touch panel to determine a contact position within the operation area and a second signal received from the pressure-sensitive sensor to determine a pressing force within the operation area.

* * * * *